US008297791B2

(12) United States Patent
Kuang et al.

(10) Patent No.: US 8,297,791 B2
(45) Date of Patent: Oct. 30, 2012

(54) CONTROL NETWORK FOR LED-BASED LIGHTING SYSTEM IN A TRANSIT VEHICLE

(75) Inventors: Baixiong Kuang, Diamond Bar, CA (US); Jerry Lin, Rowland Heights, CA (US); Yongchang Wang, Diamond Bar, CA (US); Chin Seong Khor, Monterey Park, CA (US)

(73) Assignee: I/O Controls Corporation, Azusa, CA (US)

( * ) Notice: Subject to any disclaimer, the term of this patent is extended or adjusted under 35 U.S.C. 154(b) by 0 days.

(21) Appl. No.: 13/114,997

(22) Filed: May 24, 2011

(65) Prior Publication Data
US 2012/0127719 A1 May 24, 2012

Related U.S. Application Data

(62) Division of application No. 11/850,659, filed on Sep. 5, 2007.

(60) Provisional application No. 60/966,547, filed on Jul. 17, 2007.

(51) Int. Cl.
*F21S 4/00* (2006.01)
(52) U.S. Cl. ............... 362/249.02; 362/459; 362/479
(58) Field of Classification Search ............. 362/290, 362/291, 294, 373, 459, 470–472, 479, 249.02
See application file for complete search history.

(56) References Cited

U.S. PATENT DOCUMENTS

| | | | | |
|---|---|---|---|---|
| 4,088,881 A * | 5/1978 | Neer et al. | ...................... | 362/223 |
| 4,157,584 A * | 6/1979 | Bhatt | ............................. | 362/479 |
| 4,574,336 A * | 3/1986 | Mikalonis | ..................... | 362/479 |
| 5,347,434 A * | 9/1994 | Drake | ............................. | 362/472 |
| 6,827,472 B1 * | 12/2004 | Myburgh | ....................... | 362/480 |
| 7,566,154 B2 * | 7/2009 | Gloisten et al. | ............... | 362/545 |
| 7,695,172 B2 * | 4/2010 | Dardis et al. | .................. | 362/471 |

* cited by examiner

*Primary Examiner* — Tung X Le
(74) *Attorney, Agent, or Firm* — Irell & Manella LLP

(57) ABSTRACT

A transit vehicle lighting system has a plurality of LED-based lighting fixtures for providing interior illumination. A control network comprises a plurality of slave nodes for controlling the LED-based lighting fixtures, and a master node for controlling the slave nodes. The master node may be connected to the slave nodes by a combined power/communication bus in a daisy chain fashion. The slave node may include a power regulator and a controller for providing a target current command to the power regulator, and may adjust the target current based upon temperature measurements or a recorded age of the LEDs. An optical sensor may provide automatic dimming. A reduced number of LEDs may be used in an emergency mode. The lighting fixture may include a ceiling panel fixture and a riser panel attachable by way of a hinge mechanism.

6 Claims, 22 Drawing Sheets

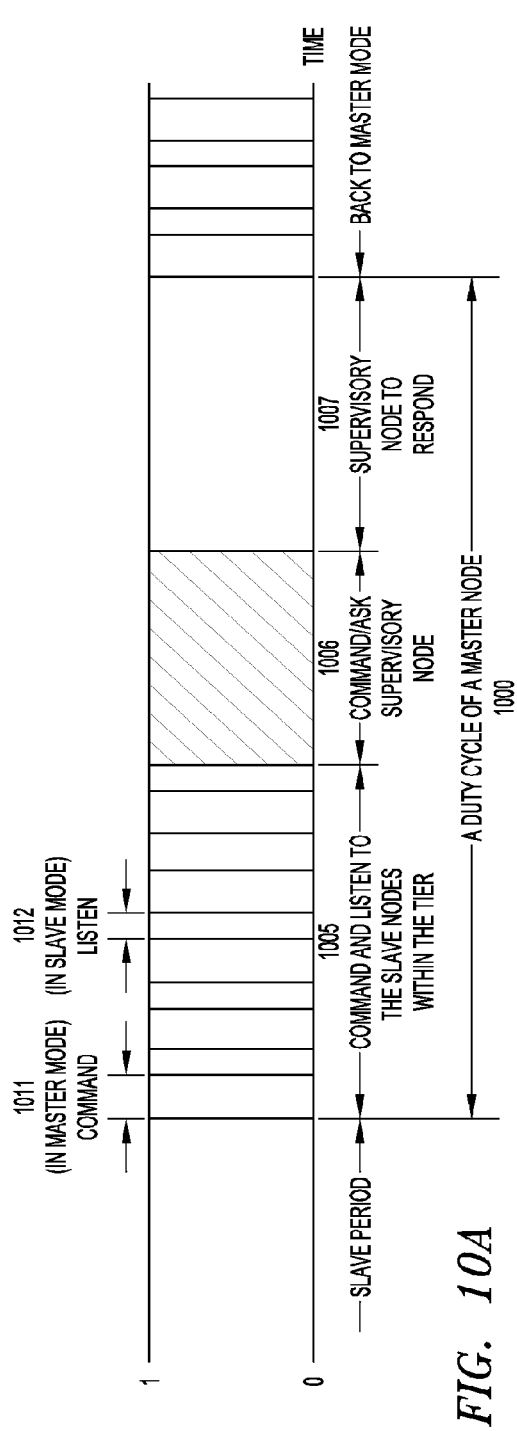
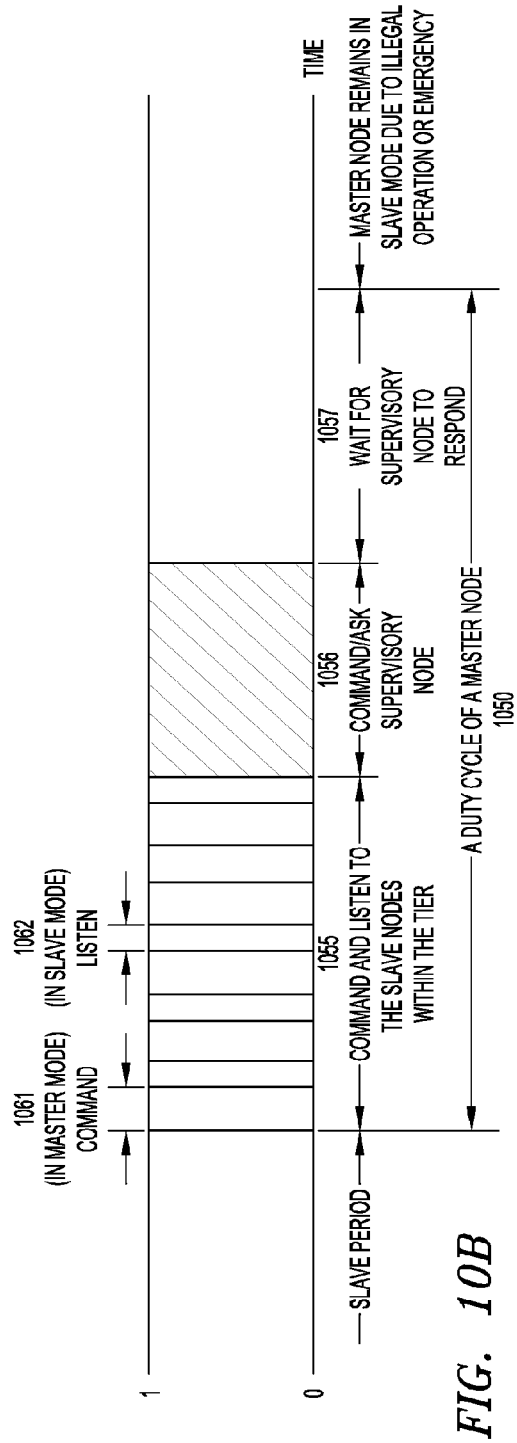
FIG. 10A
FIG. 10B

| Time (month) | LED current (mA) | PWM duty (%) |
|---|---|---|
| 0 | 150.5 | 43 |
| 3 | 157.5 | 45 |
| 6 | 164.5 | 47 |
| 9 | 171.5 | 49 |
| 12 | 178.5 | 51 |
| 15 | 185.5 | 53 |
| 18 | 192.5 | 55 |
| 21 | 199.5 | 57 |
| 24 | 206.5 | 59 |
| 30 | 213.5 | 61 |
| 36 | 220.5 | 63 |
| 42 | 227.5 | 65 |
| 48 | 234.5 | 67 |
| 54 | 241.5 | 69 |
| 60 | 248.5 | 71 |
| 66 | 255.5 | 73 |
| 72 | 262.5 | 75 |
| 78 | 269.5 | 77 |
| 84 | 276.5 | 79 |
| 90 | 283.5 | 81 |
| 96 | 290.5 | 83 |
| 102 | 297.5 | 85 |
| 108 | 304.5 | 87 |
| 114 | 311.5 | 89 |
| 120 | 318.5 | 91 |
| 126 | 325.5 | 93 |
| 132 | 325.5 | 93 |
| 138 | 325.5 | 93 |
| 144 | 325.5 | 93 |
| 150 | 325.5 | 93 |

CONTROL NETWORK FOR LED-BASED LIGHTING SYSTEM IN A TRANSIT VEHICLE

RELATED APPLICATION INFORMATION

This application is a divisional of U.S. patent application Ser. No. 11/850,659, filed Sep. 5, 2007, currently pending, which claims the benefit of U.S. Provisional Application Ser. No. 60/966,547, filed on Jul. 17, 2007, both of which are hereby incorporated by reference as if set forth fully herein.

BACKGROUND OF THE INVENTION

1) Field of the Invention

The field of the present invention generally relates to lighting systems and, more particularly, to control networks for lighting systems used in transit vehicles or conveyances such as buses, lightrail cars, and the like.

2) Background

Transit vehicles and similar conveyances typically rely on fluorescent lighting to provide illumination, in part because of the historical efficiency of such lighting as compared to, e.g., incandescent lighting. However, fluorescent lighting has drawbacks and limitations.

For example, fluorescent lighting has a relatively short lifetime and a high current draw as compared to some other types of lighting, in particular low power light-emitting diodes (LEDs). In a typical setting, the fluorescent lights receive power from the transit vehicle's battery, which is usually 24 volts, the output of which is "chopped" to provide an alternating current source. The nature of fluorescent lights leads to high electro-magnetic fields, making compatibility with other electrical equipment challenging. Fluorescent lights also often have problems with arcing, which in turn can pose fire dangers or else blow out electrical components and/or cause power ripples. Fluorescent lights are also traditionally wired in a point-to-point fashion, requiring a substantial amount of wiring.

In addition, fluorescent lighting is not very amenable to flexible control, and can be difficult to dim. For example, if the fluorescent lamp filaments get too cool when attempting to dim the lamp, then the lamp may simply go out. If current continues to flow while the electrodes are at an improper temperature, then severe rapid degradation of the filaments is possible.

Some efforts have been made to try to incorporate LED lights in transit vehicles, but it is not clear that such efforts have been able to overcome the many disadvantages and limitations of fluorescent lighting.

It would therefore be advantageous to provide a lighting system for a transit vehicle or conveyance, which overcomes one or more of the disadvantages or limitations of conventional lighting systems. It would further be advantageous to provide such a lighting system which has improved lifetime and power/current consumption, requires less wiring, and/or is more easily controlled. It would also be advantageous to provide such a lighting system which is inexpensive and not overly complex to implement or deploy, and/or has other benefits and advantages not found in conventional transit vehicle lighting systems.

SUMMARY OF THE INVENTION

The invention is generally directed in one aspect to a novel and versatile lighting system that is particularly well suited for a transit vehicle or similar conveyance, but which may find other uses or applications as well. According to one embodiment as disclosed herein, an LED-based lighting fixture for a transit vehicle comprises a plurality of LEDs for illuminating an area of a transit vehicle, a power regulator receiving an input power supply signal, and a controller for providing a target current command to the power regulator. The controller may adjust the target current based upon temperature measurements received from a temperature sensor, and/or based upon a recorded age of the LEDs. An optical sensor may provide automatic dimming. A reduced number of LEDs may be employed when in an emergency mode.

In various forms and embodiments, the lighting fixture may be part of an LED-based control network in which a plurality of LED-based lighting fixtures each comprise a plurality of LEDs for illuminating an area of a transit vehicle, a plurality of slave nodes for controlling the LED-based lighting fixtures, and a master node in communication with the slave nodes. A digital communications bus may be provided for communicating among the master node and the slave nodes. The digital communications bus may be combined with a power supply cable, and the master node may be connected to the slave nodes by wiring the combined digital/power cable/bus in a daisy chain fashion from slave node to slave node.

In other embodiments, the LED-based lighting fixture may include a ceiling panel fixture having a ceiling panel adapted to abut a transit vehicle interior sidewall and an LED lighting mount on which the LEDs are disposed, and a riser panel attached to the ceiling panel fixture and adapted to abut a transit vehicle ceiling or interior top mounting surface. The riser panel may include a locking mechanism for securing the riser panel to the transit vehicle ceiling or interior top mounting surface, and a detachable hinge for releasably attaching to the ceiling panel fixture, whereby the riser panel may be fully removed from and reattached in position by releasing the locking mechanism. Alternatively, the riser panel may include a permanent hinge for attaching the riser panel to the ceiling panel fixture, whereby the riser panel may be rotationally swung open by releasing the locking mechanism.

Further embodiments, variations and enhancements are also disclosed herein.

BRIEF DESCRIPTION OF THE DRAWINGS

FIGS. 10A and 10B are timing diagrams for communication in a hierarchical control network having a matrix architecture, such as the control network illustrated in FIG. 9.

FIGS. 11A and 11B are diagrams illustrating cross-sectional views of a lighting panel fixture with LEDs for illumination as may be used in a transit vehicle, while

FIGS. 15A and 15B are diagrams illustrating, respectively, front and back oblique views of another embodiment of a lighting panel fixture with LEDs for illumination as may be used in a transit vehicle, while

DETAILED DESCRIPTION OF PREFERRED EMBODIMENT(S)

According to various embodiments as disclosed herein, a lighting fixture and control network for an LED-based lighting system for use in a transit vehicle may comprise, for example, one or more of (i) a plurality of lighting fixtures each having LEDs for illuminating an area of a transit vehicle; (ii) a power regulator for receiving an input power supply signal; (iii) a controller for providing a target current command to the power regulator; (iv) a plurality of slave nodes for controlling the LED-based lighting fixtures; (v) a master node in communication with the slave nodes; (vi) a digital communications bus for communicating among the master node and the slave nodes; (vii) a power supply cable integrated with the digital communications bus, connecting the master node to the slave nodes in a daisy chain fashion; (viii) an optical sensor for detecting ambient light in order to provide automatic dimming of the LEDs; and (ix) an emergency mode in which a reduced number of LEDs are employed. In certain embodiments, the controller may adjust the target current based upon temperature measurements received from a temperature sensor, and/or based upon a recorded age of the LEDs. In other embodiments, the LED-based lighting fixture may include a ceiling panel fixture having a ceiling panel adapted to abut a transit vehicle interior sidewall and an LED lighting mount on which the LEDs are disposed, and a riser panel attached to the ceiling panel fixture and adapted to abut a transit vehicle ceiling or interior top mounting surface. The riser panel may include a locking mechanism for securing the riser panel to the transit vehicle ceiling or interior top mounting surface, and a hinging mechanism (detachable or permanent) for attaching to the ceiling panel fixture, whereby the riser panel may be fully removed from and reattached in position by releasing the locking mechanism or else rotationally swung open by releasing the locking mechanism.

Figure 1:
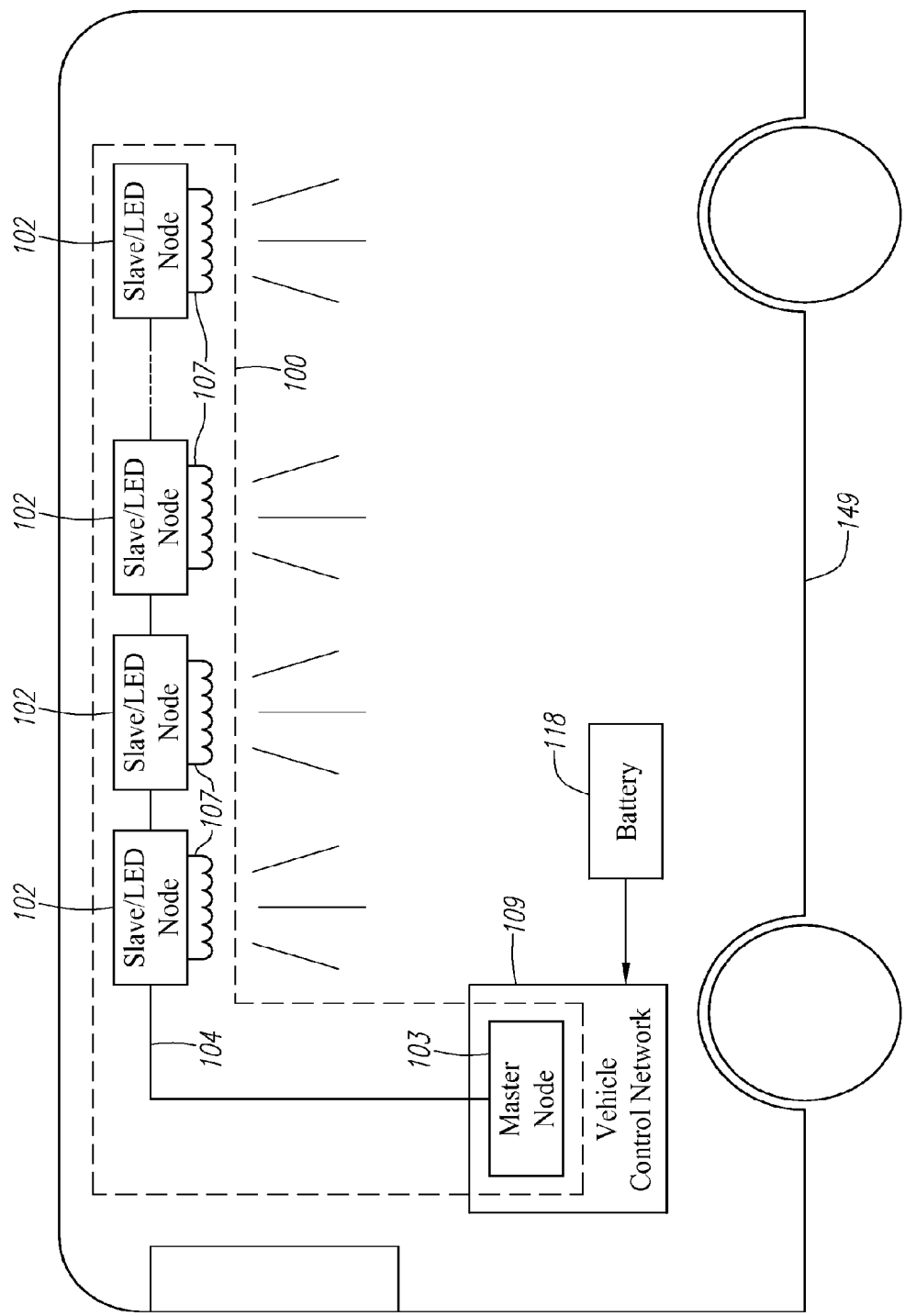
FIG. 1 is a conceptual diagram showing an example of a lighting control system for a transit vehicle in accordance with one embodiment as disclosed herein.

FIG. 1 is a conceptual diagram of an example of a preferred lighting control system as may be used in connection with a transit vehicle, in accordance with one embodiment as disclosed herein. In FIG. 1, a preferred lighting control system 100 comprises part of, or interacts with, a vehicle control network 109 that controls various functions and operations of a transit vehicle 149. The vehicle control network 109, through various network nodes or other components, may control or monitor aspects of the transit vehicle's operational features such as, e.g., its transmission system, engine sensors or controls, air conditioner, light indicators or displays, front and rear doors, magnetic breakers, kneeling mechanism, wheel chair platform, headlights, tail lights, control switches, instrument panel, internal lighting system, and so on. In one aspect, the lighting control system 100 may comprise a subsystem of the vehicle control network 109, although in other embodiments the lighting control system 100 may be standalone or independent of the main vehicle control network 109.

As further illustrated in FIG. 1, power may be provided to the vehicle control network 109 and/or lighting control network 100 via an on-board battery 118, which typically will be rated 24 Volts for a transit vehicle although the actual voltage output may vary over time and under various conditions. The lighting control network 100 in this example comprises a plurality of network nodes including a master node 103 and a series of slave/LED nodes 102, each of which constitutes or is associated with an LED-based lighting fixture having local electronic control but responsive to the master node 103. A power/data bus 104 preferably interconnects the series of slave/LED nodes 102 in a daisy-chain fashion. Each of the slave/LED nodes 102 may include a plurality of LEDs 107 arranged on a lighting panel or other fixture to provide illumination for a particular interior region of the transit vehicle 149.

Figure 2A:
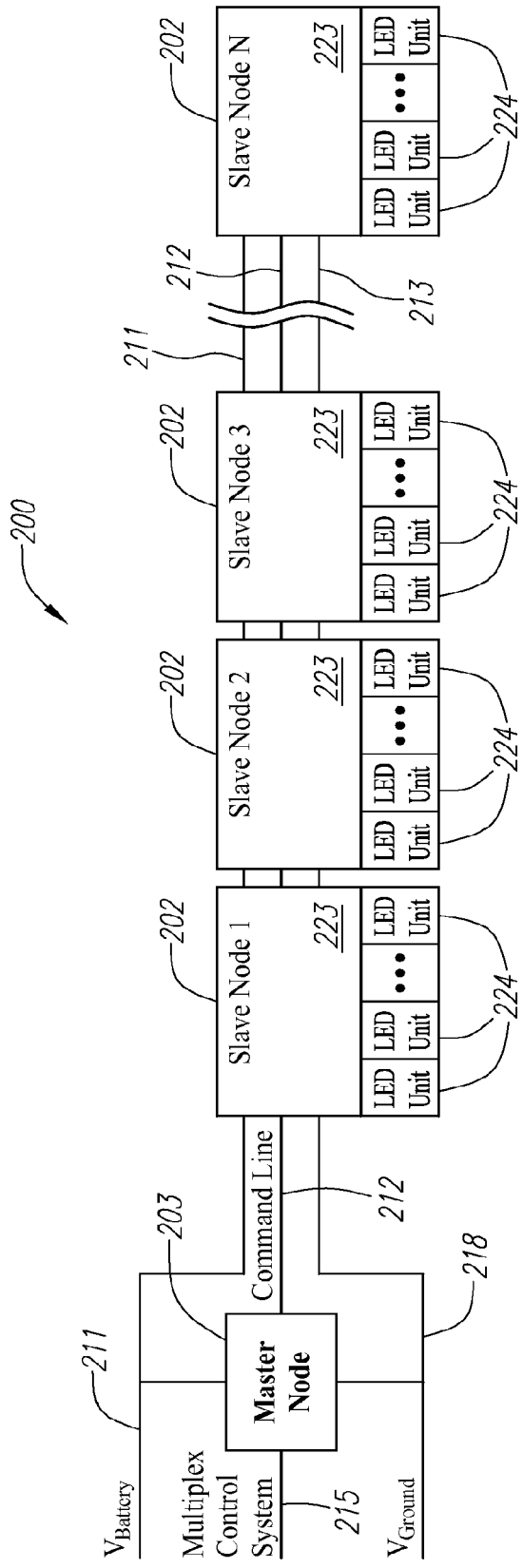
FIG. 2A is a high level architectural diagram of an embodiment of a lighting control system in accordance with the principles illustrated in and/or described with respect to FIG. 1.

FIG. 2A is a high level architectural diagram of an embodiment of a lighting control system 200 in accordance with the principles illustrated in FIG. 1, showing additional details thereof. As illustrated in FIG. 2A, the lighting control system 200 comprises a master node 203 and a series of LED-based lighting fixtures 202, each of which constitutes or is associated with a slave/LED network node having local control electronics responsive to the master node 203, similar to the lighting control system 100 of FIG. 1. Each of the LED-based lighting fixtures 202 in this example comprises a network (slave) node 223 and one or more LED units 224. Each LED unit 224 comprises one or more LEDs arranged thereon to provide illumination for a particular interior region of a transit vehicle. The LED-based lighting fixtures 202 are preferably interconnected in series, in a daisy-chain manner, as described with respect to FIG. 1. A power bus comprising a power supply line 211 from the vehicle battery and a ground line 213 is preferably connected from the master node 203 to each LED-based lighting fixture 202 and slave node 223 thereof, in series. Likewise, a command/data bus 212 may be connected from the master node 203 to each LED-based lighting fixture 202 and slave node 223 thereof, in series. Although other techniques may be used, by connecting the LED-based lighting fixtures in daisy-chain fashion, wiring of the interior lights for the transit vehicle may be advantageously simplified.

In operation, the master node 203 may communicate with the main vehicle control network (e.g., control network 109 in the example of FIG. 1) and may respond to commands or queries therefrom, and/or may send alarm signals, interrupts, or status information to the main vehicle control network. The master node 203 may also control the various LED-based lighting fixtures 202, and slave nodes 223 thereof, through commands or queries transmitted over the command/data bus 212. The command/data bus 212 may be embodied as any suitable bus, and may, for example, be serial or parallel in nature, and may be electrical or optical in nature (e.g., using fiber optics). The master node 203 and slave nodes 223 may be arranged in a linear configuration, or else may be arranged in a loop configuration as explained hereinafter for increased reliability and redundancy. Commands or inquiries may be transmitted from the master node 203 over the command/data bus 212 to the first slave node 223 (Slave Node 1), which then propagates the commands or inquiries over the command/data bus 212 to the next slave node 223 (Slave Node 2) in the chain, and so on in sequence until the command or inquiry reaches the last slave node 223 (Slave Node N) if necessary. Commands or inquiries need not be propagated if the targeted slave node 223 receives the command or inquiry and responds thereto; however, it may nonetheless be desirable in some configurations to propagate all commands and inquiries, or certain subsets thereof, to all of the slave nodes 223 in the lighting control network 200.

Via commands or inquiries conveyed over the command/data bus 212, the master node 203 may control, individually or by group, the individual LED units 224 of each LED-based lighting fixture 202. The master node 203 may, for example, command certain LED units 224 to turn on, turn off, dim by a specified amount, intensify by a specified amount, flash (e.g., in emergency situations), or activate according to a predetermined pattern. Dimming may be accomplished by pulse width modulation, thereby reducing the percentage of time that the LEDs are turned on, and/or by turning off selected LEDs and thereby reducing the number of "on" LEDs at a given time. Likewise, the intensity of light may be increased by increasing the percentage of time that the LEDs are turned on using pulse width modulation, and/or by turning on additional selected LEDs which are initially in an "off" state. The master node 203 may convey commands to the slave nodes 223 at each LED-based lighting fixture 202, and, in response thereto, the slave nodes 223 may be responsible for locally controlling the electronics at each LED-based lighting fixture 202 in order to implement the command received from the master node 203.

Figure 2B:
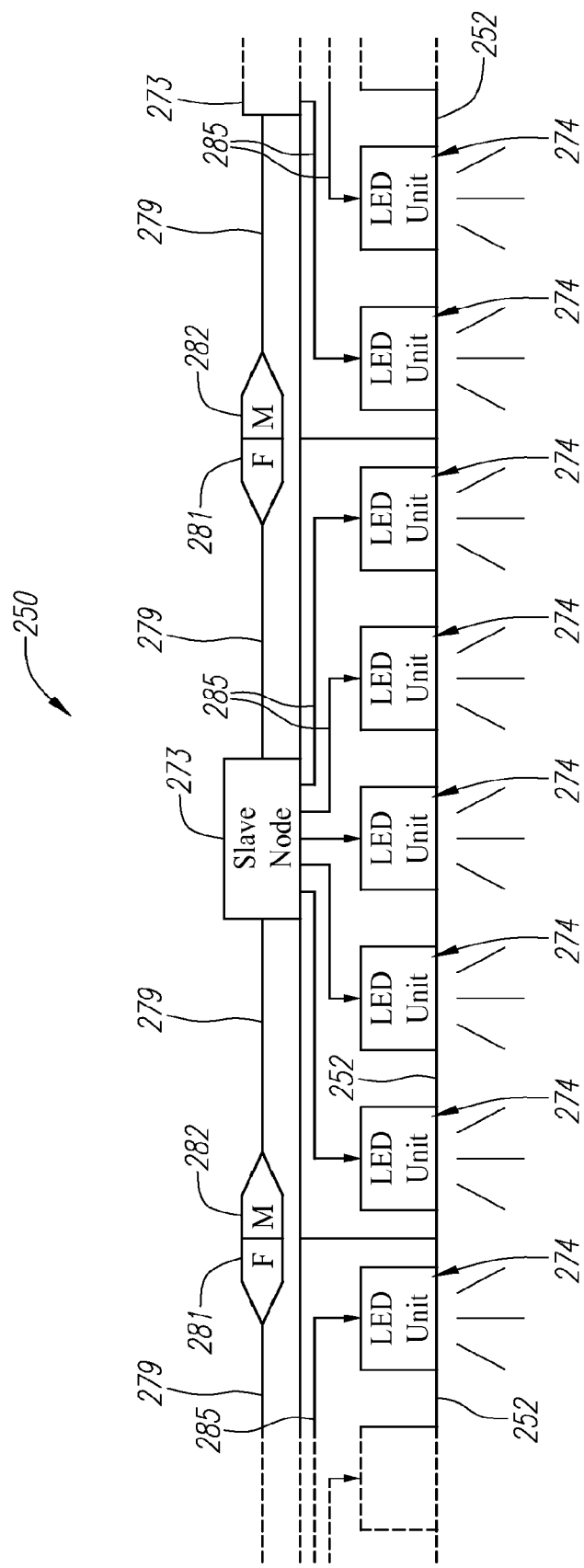
FIG. 2B is a diagram of an embodiment in which LED-based lighting fixtures are connected in series, according to one example of a lighting control system constructed in accordance with various principles illustrated in and/or described with respect to FIG. 2A.

FIG. 2B is a diagram of an embodiment in which LED-based lighting fixtures 252 are connected in series, according to one example of a lighting control system 250 constructed in accordance with various principles illustrated in and/or described with respect to FIG. 2A. In FIG. 2B, the lighting control system 250 includes a plurality of LED-based lighting fixtures 252, each of which includes, among other things, one or more LED units 274, as may be embodied according to the various examples described herein. The LED units 274 typically comprise a plurality of LEDs for illumination of the interior of a transit vehicle. The LED-based lighting fixtures 252 are illustrated in FIG. 2B as physically connected in series. They may, for example, be physically installed along the ceiling region above the seating area of a transit vehicle, thereby providing continuous illumination for occupants in the interior of the transit vehicle. Each of the LED-based lighting fixtures 252 also preferably includes a slave node 273 as described with respect to FIG. 2A and other embodiments elsewhere herein. The slave nodes 273 of the LED-based lighting fixtures 252 may, as illustrated in FIG. 2B, be connected by a series of cables 279, thereby simplifying wiring requirements of the transit vehicle lighting system. Complementary mating connectors (e.g., female and male connectors 281, 282) may be used to secure the cables 279 to one another between the various slave nodes 273. Each cable 279 may carry a plurality of electrical signals including, e.g., battery power and ground signals (211 and 213 in FIG. 2A) and one or more command/data bus signals (212 in FIG. 2A).

As generally described previously, the slave nodes 273 provide local control of the various LED units 274 on a particular LED-based lighting fixture 252. The slave nodes 273 are accordingly coupled to the various LED units 274 via one or more control and/or power signals 285. A preferred set of particular signals that are included among the control and/or power signals 285 is described with respect to FIG. 4 herein, although not all the signals in FIG. 4 may be necessary in various embodiments, or else additional electrical signals may be provided if additional functions are included.

As noted, one potential benefit of the arrangement in FIG. 2B is the simplification of wiring needed for the illumination system in a transit vehicle. Such an arrangement dispenses with the need for individual power cables being separately routed from the battery source to each lighting fixture (as is typically done with fluorescent lighting fixtures), and also, by virtue of using LEDs, dispenses with the need for ballasts for each of the lighting fixtures. The arrangement in FIG. 2B therefore uses less wiring, and consequently can be less expensive and more lightweight. Use of serial cables 279 also makes wiring of power and control signals relatively simple and easy to install and maintain.

Figure 3:
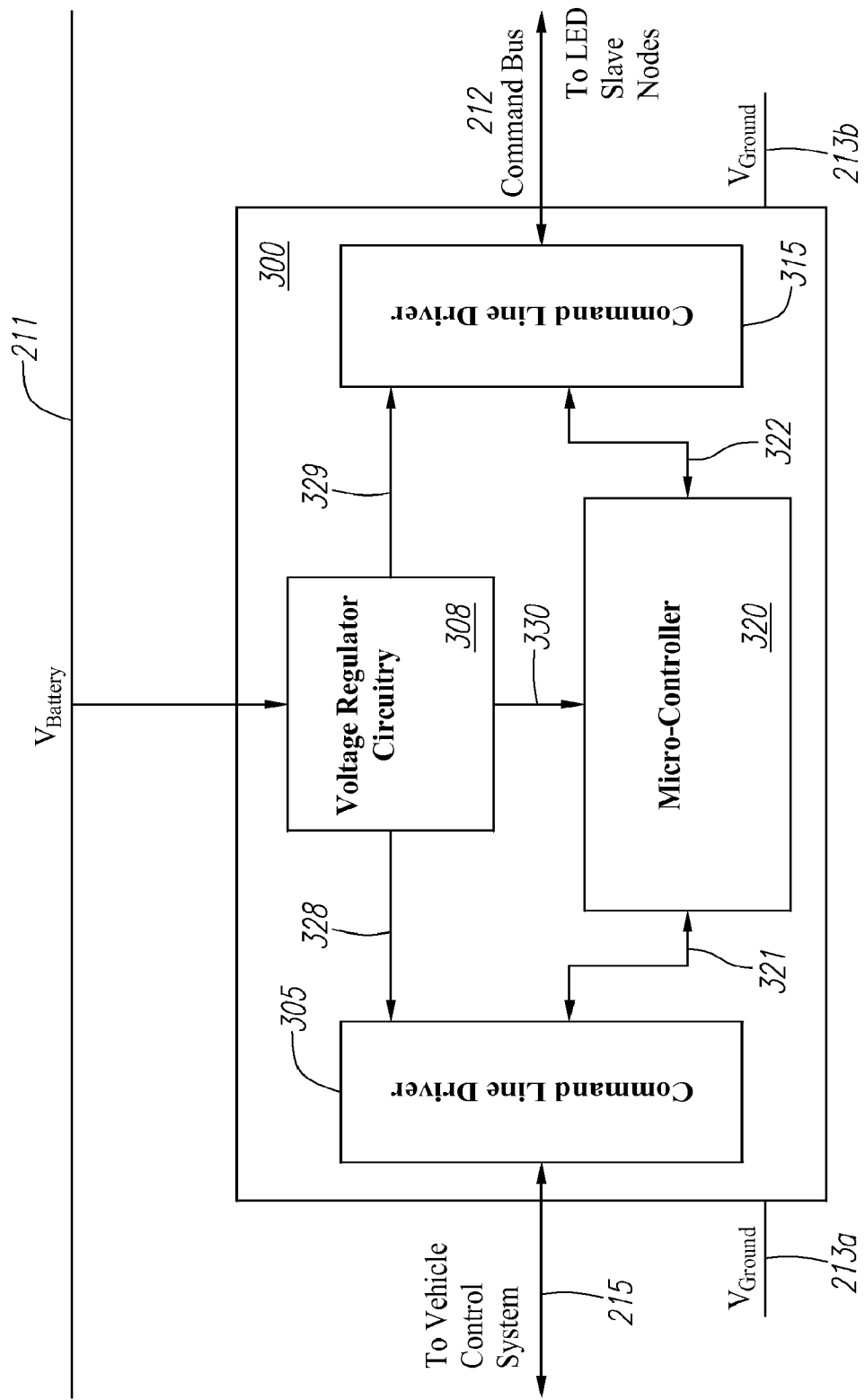
FIG. 3 is a block diagram of a master node as may be used, for example, in the lighting control system depicted in FIG. 2A or otherwise.

FIG. 3 is a block diagram of a preferred master node 300 as may be used, for example, in the lighting control system depicted in FIG. 2A. In the example illustrated in FIG. 3, the master node 300 is connected to the power supply line 211 and ground line (shown as separate input and output ground lines 213a and 213b, collectively referred to as ground line 213). The master node 300 preferably includes a voltage regulator 308 which receives a power signal from the power supply line 211, and converts the (typically 24 Volt) input power signal to a stable low voltage power output signal for digital electronics and other components within the master node 300. The voltage regulator 308 outputs appropriate internal power supply signals 328, 329 and 330 to other components of the master node 300.

The master node 300 also preferably includes a micro-controller 320 for performing the supervisory control and logic functions of the lighting control system. Although not expressly shown in FIG. 3, the micro-controller 320 would be understood to include appropriate memory (e.g., RAM and/or ROM), interfaces, and drivers, as well as logic circuitry including, for example, a microprocessor, FPGA, or other programmable logic. A main network command line driver 305 interfaces with the main vehicle control network via a network communication bus 215. Likewise, a lighting control system command line driver 315 interfaces with other lighting control system network components via a data/command bus 212, which is interconnected to downstream LED-based lighting fixtures in a manner described with respect to FIG. 2A.

In operation, the micro-controller 320 communicates with the main vehicle control network over the network communication bus 215 and may, for example, send periodic status updates or alarm signals to the main vehicle control network, or else respond to various commands or inquiries received from the main vehicle control network. The micro-controller 320 also is responsible for communicating with the slave nodes 223 of the LED-based lighting fixtures 202 via commands or inquiries sent over the data/command bus 212, and may also, for example, receive periodic status updates or alarm signals sent by the slave nodes 223. The master node, under control of micro-controller 320, may communicate with the slave nodes according to, e.g., a polling scheme whereby the slave nodes 223 are periodically queried for status information or other data.

Figure 4:
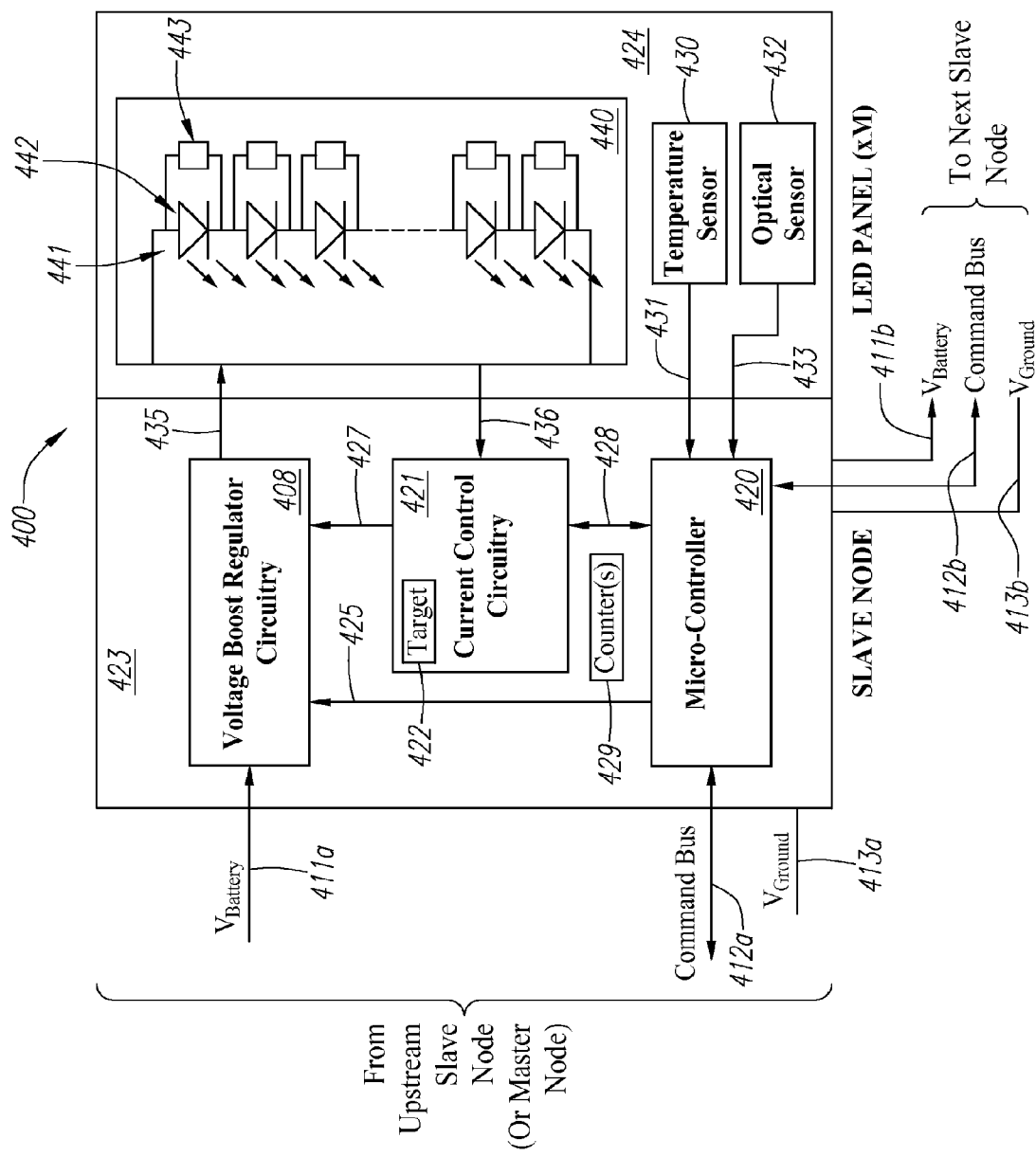
FIG. 4 is a block diagram of an LED-based lighting fixture and slave node as may be used, for example, in the lighting control system depicted in FIG. 2A or otherwise.

FIG. 4 is a block diagram of a preferred LED-based lighting fixture 400, including a slave node 423, as may be used, for example, in the lighting control system depicted in FIG. 2A. In the example illustrated in FIG. 4, the LED-based lighting fixture 400 is conceptually divided into a slave node 423, which forms a network node of the lighting control network, and one or more LED units or modules 424 as generally described previously with respect to FIG. 2A. The slave node 423 of the LED-based lighting fixture 400 is connected to an incoming power supply line 411a and ground line 413a received from an upstream LED-based lighting fixture 400 in the daisy chain (as shown in the arrangement of FIG. 2A), or, if the first fixture in the chain, from the master node 203. The LED-based lighting fixture 400 preferably includes a voltage boost regulator 408 which receives a power signal from the power supply line 411a, nominally at 24 Volts for a typical transit vehicle (although the actual voltage may swing significantly), and converts the input power signal to both a stable low voltage power output signal for digital electronics and other components within the slave node 423, and a regulated boosted voltage level for the LEDs on the various LED units 424. The voltage regulator 408 outputs appropriate internal power supply signals (not shown) to other components of the slave node 223, such as micro-controller 420 and any other components requiring a low voltage source.

The micro-controller 420 performs the local control and logic functions required by the lighting control system for causing the LEDs of the LED units 424 to turn on and off, dim, flash if necessary, and so on. Although not expressly shown in FIG. 4, the micro-controller 420 would be understood to include appropriate memory (e.g., RAM and/or ROM), interfaces, and drivers, as well as logic circuitry including, for example, a microprocessor, FPGA, or other programmable logic. The microcontroller 420 receives commands or inquiries over a data/command bus 412a from an upstream slave node 423 or the master node 203, and also propagates commands and inquiries as necessary to downstream slave nodes 223 via a continued segment of the data/command bus 412b. Although not expressly shown in FIG. 4, the slave node 423 would be understood to include command line drivers for sending appropriate data or command signals over the data/command bus 412a, 412b.

The LED unit 424 preferably includes a temperature sensor 430 and optionally an optical sensor 432, the purpose of which will be described in more detail hereinafter. The temperature sensor 430 and optical sensor 432 are preferably coupled to the micro-controller 420. The micro-controller 420 may be provided with access to one or more lifetime counters 429, which store an indication of the age of the LEDs of the LED units 424 and, in certain embodiments, may affect the amount of current provided to the LEDs as further described herein.

The number of LED units or modules 424 of the LED-based lighting fixture 400 may vary depending upon architectural needs. As one example, the LED-based lighting fixture 400 may include five LED units or modules 424 each having, e.g., eight LEDs, for a total of 40 LEDs on a single LED-based lighting fixture 400. LED protection circuits 443 may be provided in parallel with each of the LEDs 442, as known in the art, so that failure of a single LED will not necessarily impede the performance of the remaining LEDs 442. The LED units 424 are configured in parallel. For a configuration having eight LEDs 442 per LED unit 424, the voltage boost regulator circuitry 408 would provide an output 435 of approximately 35 Volts, which some variation depending upon the current draw and operational temperature of the LEDs 442. The LEDs 442 are preferably white in color temperature and have relatively high output. In one embodiment, the LEDs 442 are Luxeon K2 emitters available from Philips Lumileds Lighting Company.

In addition to communicating with upstream or downstream nodes of the LED control network, the micro-controller 420 is also preferably configured to control the local electronics to provide the LED units 424 with a regulated current appropriate to the age of the LEDs 442, ambient conditions, and incoming control commands (such as dimming commands). The micro-controller 420 may receive commands from the master node 203 and, based thereon, set or modify target parameters utilized by the current control circuitry 421 and/or voltage boost regulator circuitry 408. For example, the micro-controller 420 may receive a command to dim the lighting by a specified amount, and in response thereto, the micro-controller 420 would lower or adjust the target parameters utilized by the current control circuitry 421 and/or voltage boost regulator circuitry 408 accordingly. In a preferred embodiment, each LED unit 424 can be separately controlled and thus individually turned on/off or dimmed.

While a variety of factors or conditions may cause the LED output to vary over time, the overall output of the LED fixtures may need to meet the requirements set for mass transit vehicles regardless of ambient conditions or other variable factors. A typical mass transit vehicle standard might require, for example, 15 foot-candles of illumination over each bus seat, and 10 foot-candles of illumination in the bus aisles. The variable nature of LEDs can make it challenging to meet the minimum brightness standards. The circuitry used for LED-based lighting fixture 400 may be particularly advantageous in this regard.

Figures 13A, 13B:
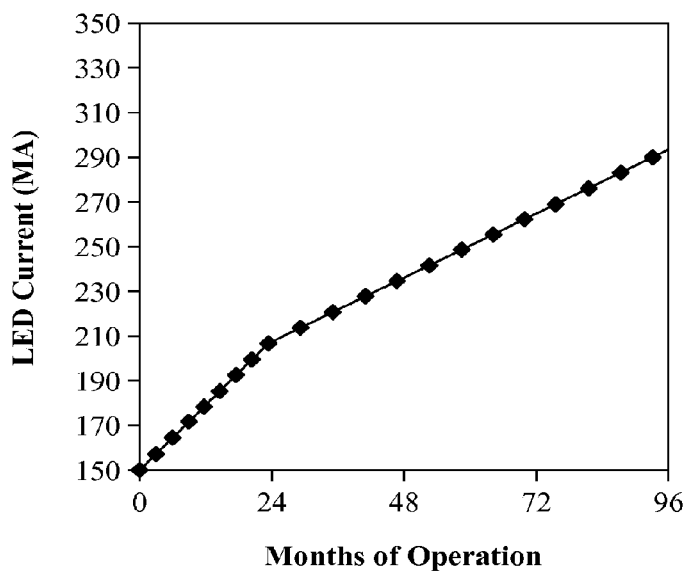
FIG. 13A is a chart illustrating an example of LED current relative to age (in months)
FIG. 13B is a graph illustrating similar information.

In one embodiment, the current control circuitry 421, by itself or under control of the micro-controller 420, controls the amount of LED current based upon factors including the operational temperature of the LEDs 442 and the age of the LEDs 442. The lifetime counter(s) 429 may be referenced to adjust the duty cycle based on the age of the LEDs 442. The age of the LEDs 442 may be stored in one or more lifetime counters 429 and continuously updated based on the micro-controller's internal clock or date stamp. For example, lifetime counter(s) 429 may store a numeric value indicating the age of the LEDs 442 in terms of months of operation. The numeric value may be initialized to zero when the LED units 424 are installed or replaced, and gradually will be incremented over time based upon the internal clock or date stamp of the micro-controller 420. In general, the older the LEDs 442, the higher the LED current that may be necessary to achieve the same level of brightness. Therefore, the micro-controller 420 may increase the target current value 422 provided to the current control circuitry 421 over time as the LEDs age. A chart depicting an example of how the LED current may be increased over time is illustrated in FIG. 13A.

In this example, each additional three months of LED age would cause the amount of necessary current to increase by the specified amount. A diagram showing a portion of this same information in graphical form is shown in FIG. 13B. The micro-controller 420 preferably stores information representing a chart similar to FIG. 13A or 13B (in the form of, e.g., an internal table) so that the target current 422 can be readily adjusted in response to the recorded age of the LEDs 442 as reflected by the numeric value stored in the lifetime counters 429. The chart in FIG. 13A also illustrates the pulse-width modulation duty cycle (in terms of percentage) that may be used to achieve the specified LED current for each entry. Thus, the current control circuitry 421 in this example may be configured to start with relatively low PWM duty cycle (e.g., 43%) when the LEDs 442 are new, and gradually increase the duty cycle over lifetime of LEDs 442 to maximum duty cycle of, e.g, 93% at 150 months.

Figure 14A:
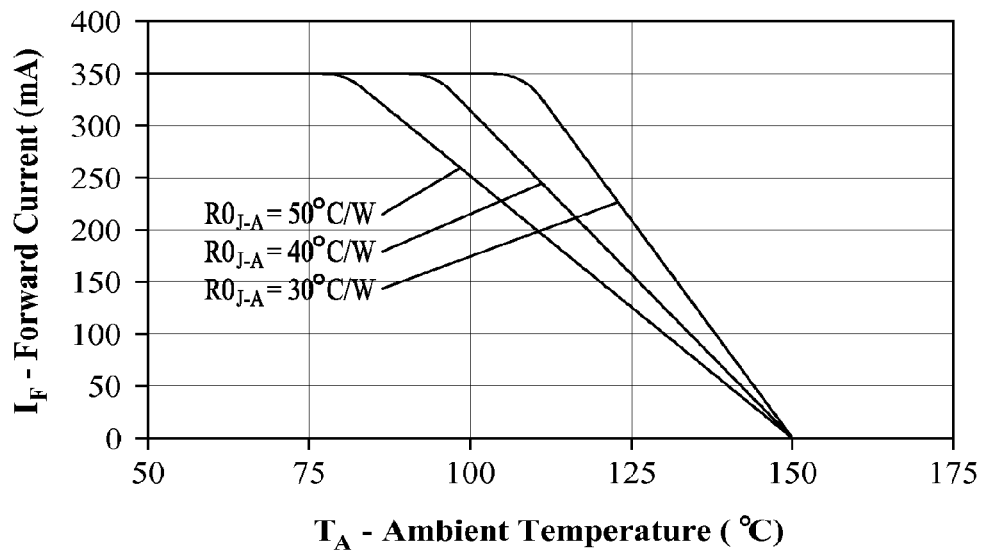
FIGS. 14A and 14B are examples of current derating graphs illustrating in general a drop in maximum LED current rating with an increase in forward junction temperature.
Figure 14B:
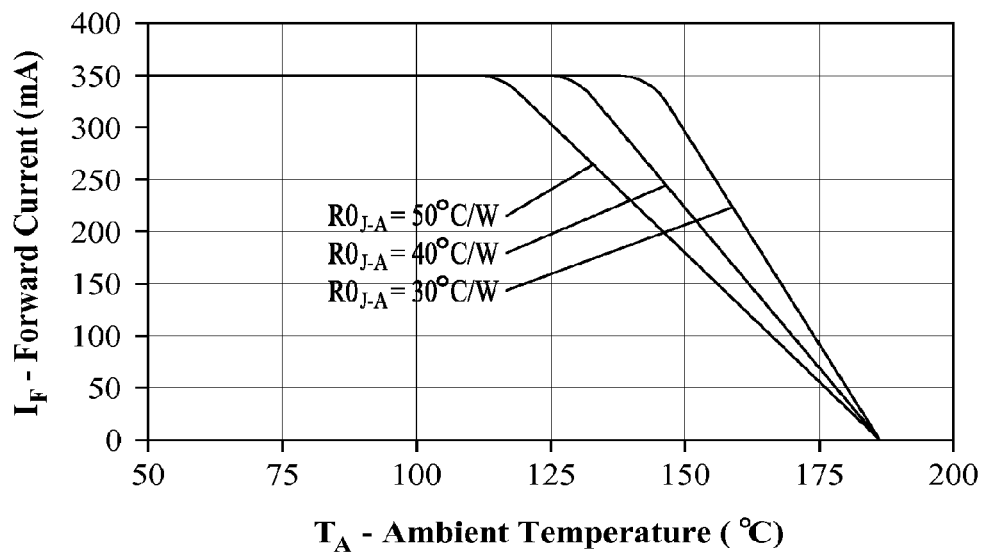

The operational temperature of the LEDs 442 may be periodically or continuously monitored using temperature sensor 430, and this information may also be provided to micro-controller 420. Micro-controller 420 may then determine a target current setting for current control circuitry 421 based on predefined temperature/current derating information stored in local memory accessible to the micro-controller 420. Examples of current derating curves showing the maximum forward LED current versus operational temperature are illustrated in FIGS. 14A and 14B, for white and colored LEDs respectively. Generally, the higher the junction temperature of the LEDs 442, the lower the maximum safe current setting. If the maximum safe current setting is exceeded, the expected lifetime of LEDs 442 can be seriously affected. Information describing the applicable current derating curve for LEDs 442 may be stored in local memory and utilized by micro-controller 420 to determine the maximum current setting for LEDs 442 to be applied by current control circuitry 421. In general, so long as the LED junction temperature is below the maximum permissible level, no temperature adjustment will be necessary, but as the maximum permissible temperature is exceeded the current control circuitry 421 will limit the LED target current level 422.

In alternative embodiments, current control circuitry 421 directly utilizes the values from the temperature sensor 430 and/or lifetime counters 429, without the need for the micro-controller 420 as an intermediary.

Figure 12:
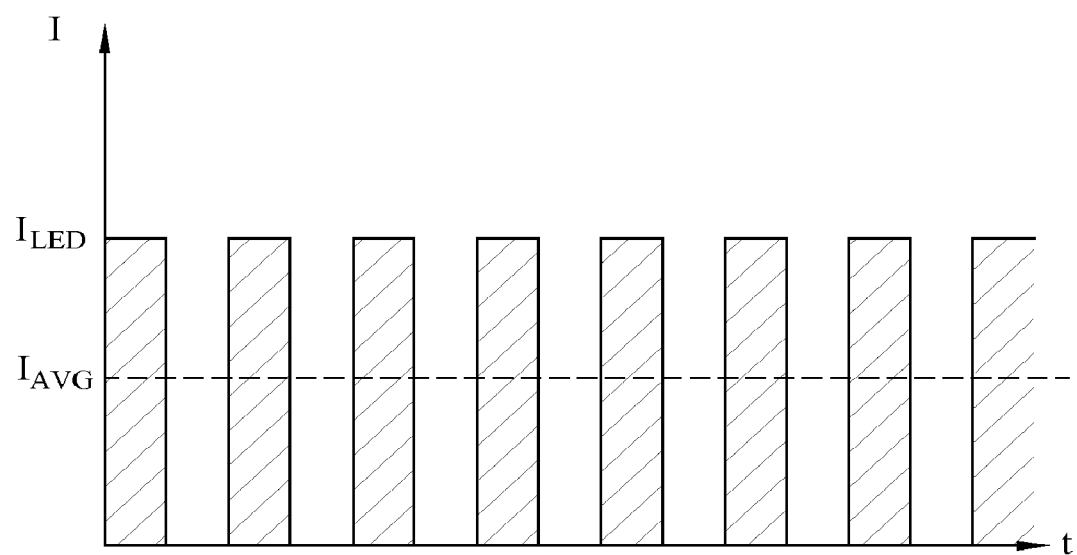
FIG. 12 are graphs illustrating an example of voltage and current waveform characteristics of an array of LEDs controlled by a lighting control system as disclosed herein.

The current control circuitry 421 outputs a control signal to the voltage boost regulator circuitry 408, whereby the boosted or regulated voltage output 435 is applied to the LED arrays 441 of LED units 424. As the temperature of the LEDs 442 increases, the current control circuitry 421 adjusts the current setting so as to avoid going above the maximum safe current limit, as described above. FIG. 12 illustrates an example of a current waveform characteristic for the LED arrays 441. As shown in FIG. 12, while the regulated voltage from voltage boost regulator circuitry 408 may vary over time, the LED current is pulse width modulated, and duty cycle set, according to the target current level as set by the current control circuitry 421. The LED current level stays relatively constant across pulses. As the LED temperature increases, the current level is decreased, under management of the current control circuitry 421, in accordance with a characteristic such as reflected in the chart of FIG. 14A. The current control circuitry 421 preferably monitors the LED current through a current sense signal 436 (which preferably senses the peak current level), in order to keep the current stable despite possible fluctuations in the regulated voltage level. The peak current value and duty cycle information allow the area of graph in FIG. 12 to be determined, which in turn allows determination of the average current. The average current may then be compared to the target current level 422 to maintain the desired current level and adjust the duty cycle as necessary. The current control circuitry 421 may implement a hard current limit, such as 350 milliamps for example, which will depend on the particular LED specifications.

In one aspect, temperature feedback is used (via temperature sensor 430) in order to adjust the LED current if necessary via current control circuitry 421, in a manner which can advantageously extend the lifetime of the LEDs by minimizing the risk of over-current conditions. Other control information or parameters, such as the measured LED current level, LED age (stored in counter(s) 429), and state of optical sensor 432 may also be used to affect the LED current, by altering the duty cycle provided by current control circuitry 421.

In some embodiments, a single temperature sensor 430 may be used for all of the LED units 424. In such a case, the temperature measured from one LED unit 424 is deemed to be an accurate estimate of the temperature on the other LED units 424. In other embodiments, a temperature sensor 430 may be provided for each LED unit 424.

In some embodiments, the micro-controller 420 provides a range of capabilities and useful features relating to the LED-based lighting fixture 400. For example, the micro-controller 420 may respond to commands from the master node 203 to shut off all or selected ones of the LED units 424. A master light shutoff command may also be sent from the master node 203 instructing all LED/slave nodes to turn off. The micro-controller 420 may also respond to commands from the master node 203 to dim the LEDs 442 on all or selected ones of the LED units 424, in which case the micro-controller 420 may instruct the current control circuitry 421 to reduce the PWM duty cycle for the affected LED units 424 by an appropriate amount. This feature may be useful, for example, to provide driver-controlled manually adjustable dimming of the lights in the transit vehicle. The micro-controller 420 may also be operative to receive an indication of the ambient light from an optical sensor 432, and adjust the power of the LEDs 442 in response thereto, thereby providing an auto-brightness function. For example, the micro-controller 420 may have a "day" mode and "night" mode, with the LEDs 442 being set to brighter (i.e., higher duty cycle) in the "night" mode. The micro-controller 420 may store a threshold value, against which the measured ambient light is compared in order to determine which brightness mode should be applied. More than two possible brightness settings responsive to the optical sensor 432 may also be provided. By reducing the brightness of the LEDs 442 when full brightness is not needed, the lifetime of the LEDs 442 may be usefully enhanced. Only a single optical sensor 432 may be needed per transit vehicle; however, more than one optical sensor 432 may be used (for redundancy) and/or at least one optical sensor 432 may be provided for LED-based lighting fixture 400.

The micro-controller 420 may also provide an overheated warning message or indication based on the temperature detected by temperature sensor 430. A special overheat indicator (which may be a colored LED located on driver's control panel or display, or locally near the LED-based lighting fixture 400) may be configured to light up or blink if the LEDs 442 overheat.

The LED-based lighting fixture 400 may also usefully provide an emergency exit lighting function. In case of an emergency, the LED-based lighting fixture 400 may be configured, under control of micro-controller 420, to automatically light up to provide passengers with a visual view and guide them to the nearest exit. A backup power supply (e.g., rechargeable battery) is preferably included to provide emergency power to the LEDs 442 in this situation. Also, a reduced number of LEDs 442 can be activated in an emergency situation, so as to minimize the size and rating requirements of the backup power supply. For example, half or fewer of the LEDs 442 could be activated in an emergency situation.

The LED-based lighting fixture 400 may also have a self diagnostics indicator, which shows if a malfunction has occurred on an LED unit 424 or elsewhere in the LED-based lighting fixture 400. In case of a malfunction, a diagnostics message with the details of the failure may be logged to the system, i.e., sent to the master node 203. Customers can thereafter access the diagnostics by downloading the information from the master node 203.

Figure 11A:
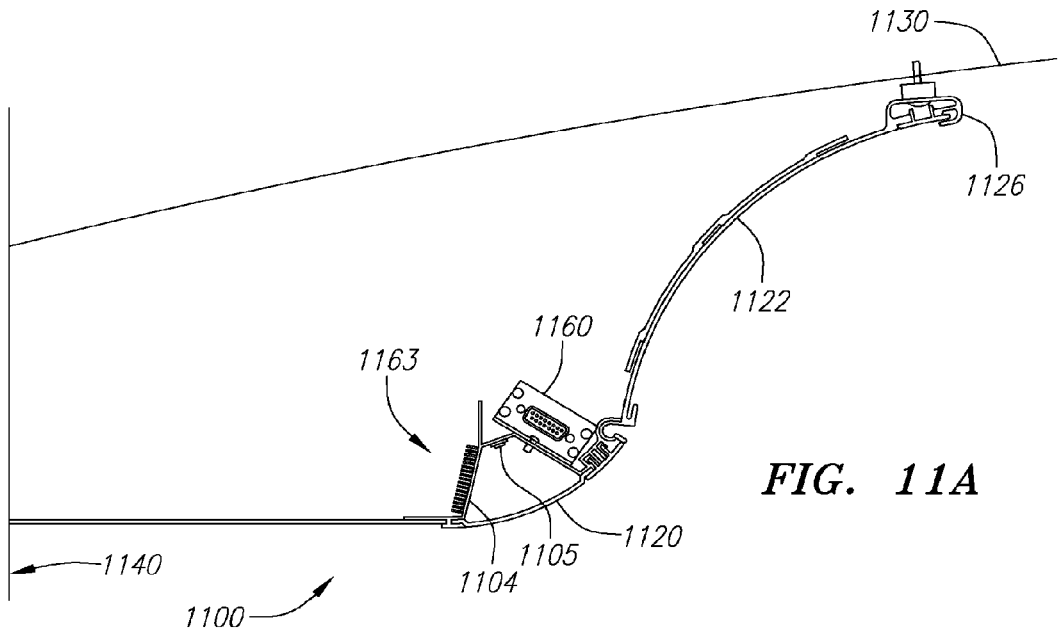
Figure 11B:
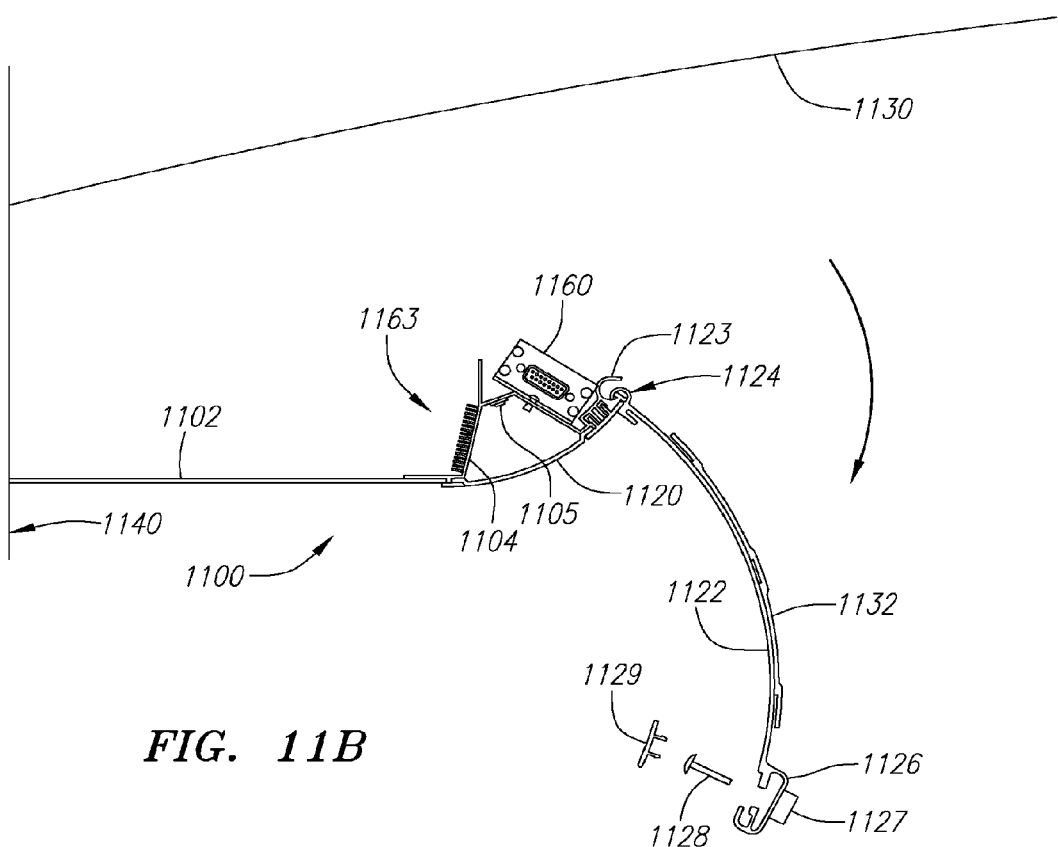

Additional features and functions pertain to a preferred mechanical configuration of an LED lighting fixture in accordance with various embodiments as disclosed herein. One exemplary embodiment is depicted in FIGS. 11A through 11G. FIGS. 11A and 11B are cross-sectional views of a lighting panel fixture 1100 with LEDs for illumination, as may be used in a transit vehicle, while FIGS. 11C through 11G are various oblique views of the lighting panel or portions thereof illustrated in FIGS. 11A and 11B. Other embodiments are illustrated in FIGS. 15A through 15E, described later herein.

As illustrated first in FIG. 11A, the lighting panel fixture 1100 includes a ceiling panel 1102, an LED lighting mount 1104, and a riser panel 1122. The ceiling panel 1102 is generally configured to be positioned directly over the seating in the transit vehicle or similar conveyance, and may abut the interior sidewall 1140 of the transit vehicle. The riser panel 1122 is, in this particular embodiment, curved in approximately a quarter arc shape, and would generally reach to the ceiling 1130 of the transit vehicle or some other top mounting surface. The riser panel 1122 may optionally be configured to allow mounting of advertising prints or similar materials, as is common in the transit industry. In the embodiment illustrated, the riser panel 1122 is detachably hinged, such that it can be pulled down (as illustrated in FIG. 11B) and temporarily removed to allow access to, e.g., a utility panel or a storage compartment. The LED lighting mount 1104 interconnects the ceiling panel 1102 and the riser panel 1122, and the LEDs 1105 (shown in side view) may be positioned along the LED lighting mount in an array or other configuration. A removable light permeable cover 1120 may be provided or affixed to the LED lighting mount 1104, for softening or evening out the illumination from the LEDs 1105. The light permeable cover 1120 is preferably of sufficient opaqueness to make the LEDs 1105 appear as a single broad light source (as opposed to discrete or individual point light source), without substantially affecting the amount of illumination output from the lighting unit.

FIGS. 11A and 11B also show further details of one possible detachable hinge mechanism for the LED lighting fixture 1100. In this example, a rounded hinge member 1124 is generally hook-shaped and configured to fit snugly in a half-cylindrical shaped hinge clasp 1123, as illustrated in FIG. 11B. A locking member 1126 on the opposite end of the riser panel 1122 preferably provides a means to securely attach to the ceiling or similar top mounting surface when the riser member is in an upright position, as in FIG. 11A. The locking member 1126 may, for example, have a removable protective cover 1129 (as shown in FIG. 11B) and a sleeve 1127 for guiding a screw 1128 into a receptor located in the ceiling 1130 of the transit vehicle or other conveyance. A protective panel cover 1132 may be positioned on the back of the riser member 1122 for additional support or reinforcement.

In one embodiment, the LED lighting mount 1104 is constructed using aluminum extrusion, and operates as a heat sink in addition to providing physical support for the LEDs. To further facilitate heat dissipation, the LED lighting mount 1104 may be configured with metallic heat dissipating fins 1163 on the backside of one or more of its walls. Such heat dissipating fins 1163 may be particularly advantageous where high power LEDs are utilized (typically having operating current from 200 mA to 700 mA or more). The riser panel 1122 may be constructed of a lightweight durable material such as fiberglass, or PVC plastic. Ceiling panel 1102 is preferably formed of a composite material, such as two metal layers sandwiching an insulator material. For example, the composite material may be DIBOND™, a lightweight yet rigid aluminium composite material consisting of a polyethylene core and aluminium cover sheets with a thickness of approximately 0.3 millimeters, coil-coated on front and reverse sides according to ECCA-Standards with a protective film. DIBOND material is commercially available from Alcan Inc. of Montreal, Canada, and is commonly used on transit vehicles. This type of composite material helps prevent condensation when air conditioning is employed.

Figure 11C:
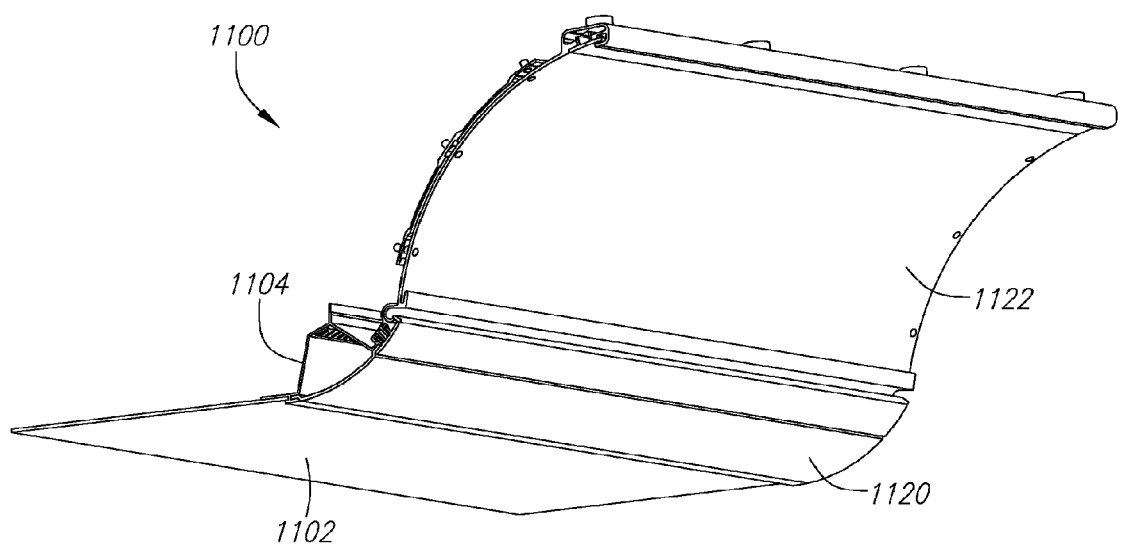
FIGS. 11C through 11G are diagrams illustrating oblique views from different angles of the lighting panel fixture or portions thereof illustrated in FIGS. 11A and 11B.
Figure 11D:
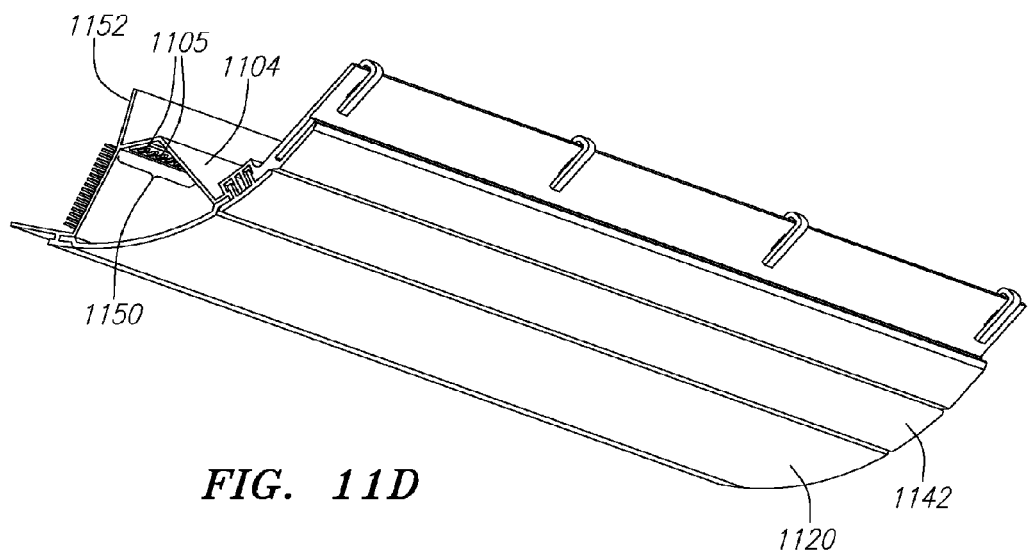
Figure 11E:
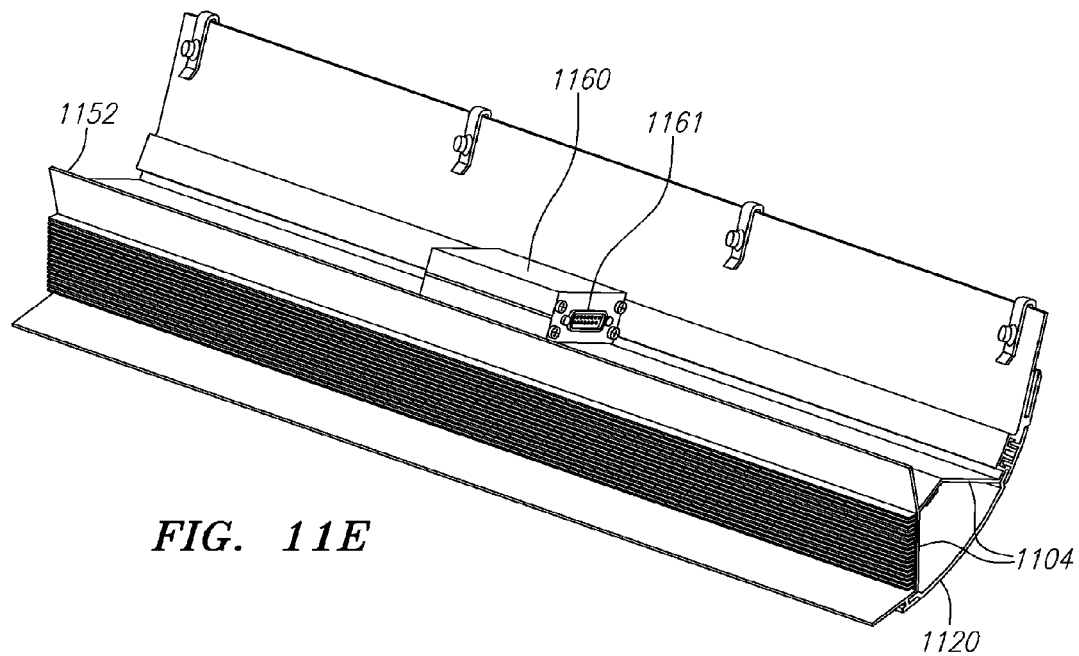
Figure 11F:
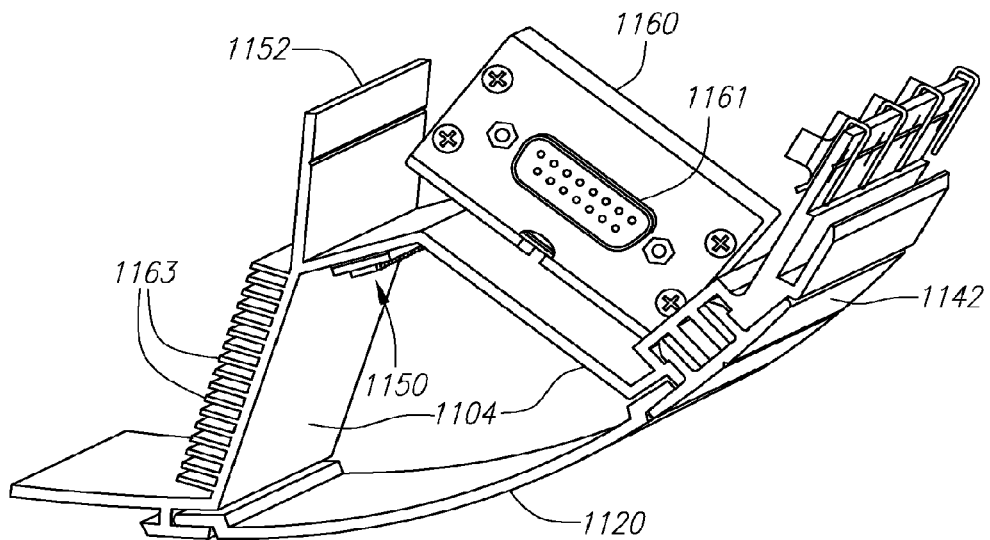
Figure 11G:
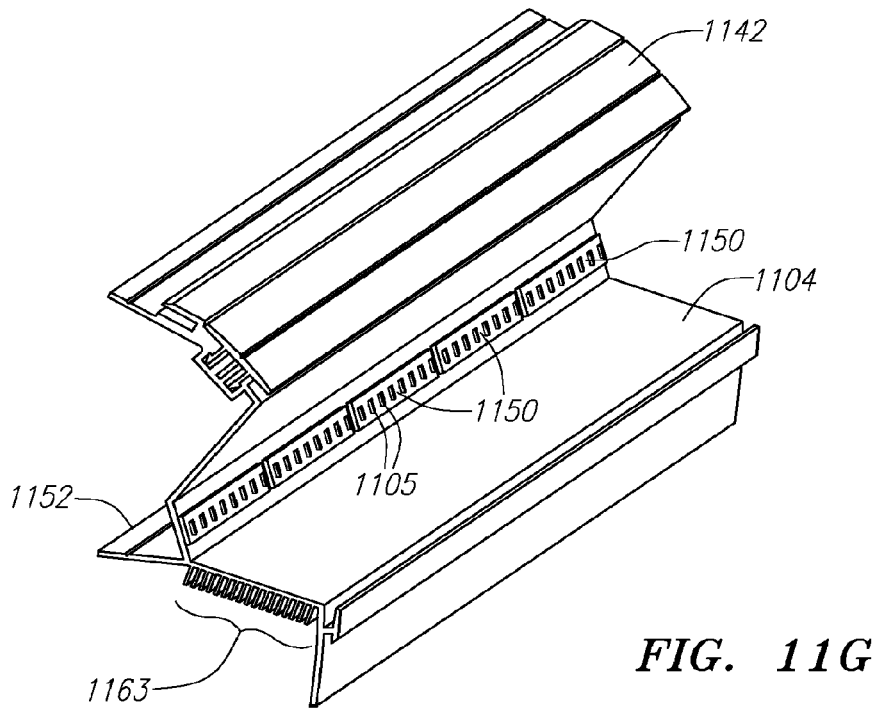

The diagrams in FIGS. 11C through 11G show additional views and details of the lighting panel fixture 1100 or portions thereof illustrated in FIGS. 11A and 11B. FIG. 11C illustrates an oblique view of the lighting panel fixture 1100. FIG. 11D illustrates primarily the LED lighting mount 1104 of the lighting panel fixture 1100, showing the opaque cover 1120 and various LED modules 1150 each having, in this example, an array of multiple LEDs 1105. The length of the lighting panel fixture 1100 may vary depending upon lighting needs. In one particular example, the lighting panel fixture 1100 (and hence the LED lighting mount 1104) is approximately 60" in length. The lighting panel fixture 1100 may comprise multiple LED units (or "light bars") 1150, e.g., five LED units 1150, each 12" long. Each LED unit 1150 in this example has eight LEDs 1105, arranged in a linear array, as more clearly shown in FIG. 11G (with light permeable cover 1120 removed). The example in FIG. 11G shows five LED units 1150 each having eight LEDs 1105. The LEDs 1105 may be mounted on a metal PCB for convenient modular attachment and/or to help dissipate heat. A removable snap-in lens holder 1142 may be provided to allow rapid removal of the light permeable cover 1120.

In a typical transit vehicle (such a passenger bus), six lighting panel fixtures 1100 may be employed on each side of the vehicle. Each LED lighting panel fixture 1100 may have a control module to drive the LEDs 1105 of the multiple LED units 1150, as described with respect to FIGS. 2A through 4 previously. The control module may be contained in a control module housing 1160 on the back of the LED lighting mount 1104, as illustrated in FIGS. 11E and 11F. Multiple lighting panel fixtures 1100 may be connected using cables with complementary connectors at either end (similar to FIG. 2B), in a daisy chain fashion, with a male connector at one end of the lighting panel fixture 1100 and a female connector on the other end. A connector socket 1161 may be provided on each side of the control module housing 1160 to facilitate such interconnection. The complementary connectors may be, e.g., pigtail connectors and may have, in one embodiment, three pins (power, ground, and a serial bus for communication) thereby conveying three electrical signals.

In the example illustrated in FIGS. 11A through 11G, the conduits in which the LED units 1150 reside are open at either end, so that when the LED lighting panel fixtures 1100 are placed in a row, a single continuous conduit is formed. By contrast, fluorescent lights generally require sockets at each end, and thus, in conventional transit vehicle lighting systems, a continuous lighting conduit does not exist. Having a single continuous conduit using a series of the lighting panel fixtures 1100 can significantly ease cleaning of the lighting fixtures. For example, it is possible to vacuum or force air through the entire continuous lighting conduit, providing the possibility of a self-cleaning mechanism. As one possible example, a bypass valve may be provided to the air conditioning or ventilation system whereby forced air can be selectively directed from one end of the continuous lighting conduit and exited at the other end, facilitating cleaning of the lighting fixtures. By contrast, fluorescent lamps generally need to be manually removed so that its lighting fixture can be cleaned.

Figure 15A:
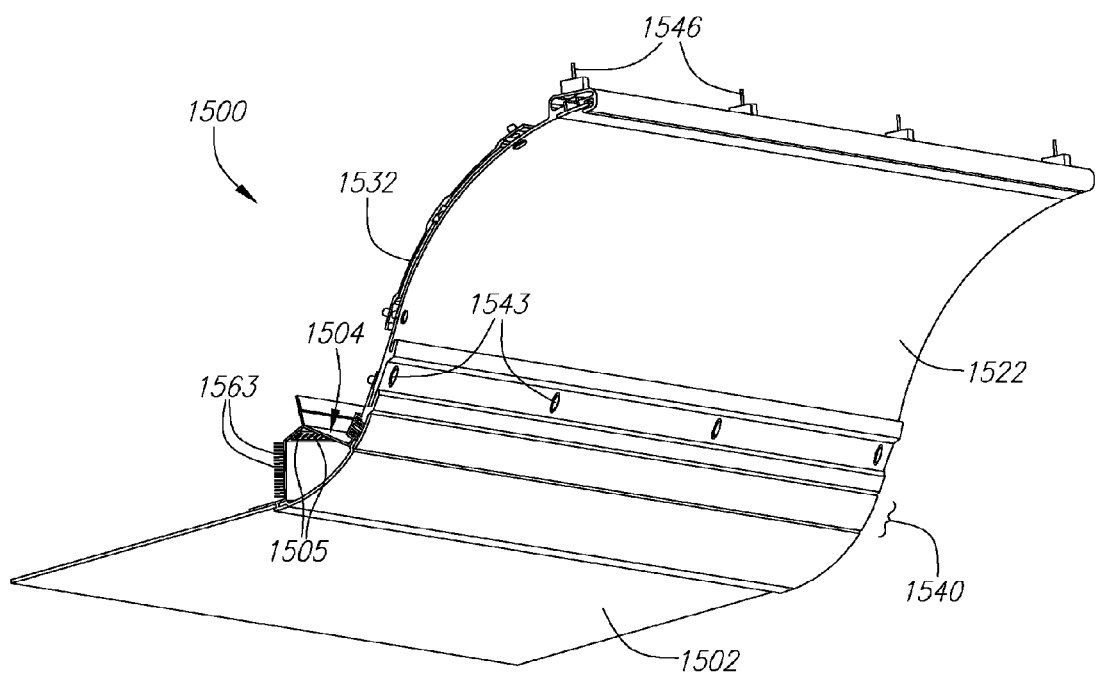
Figure 15B:
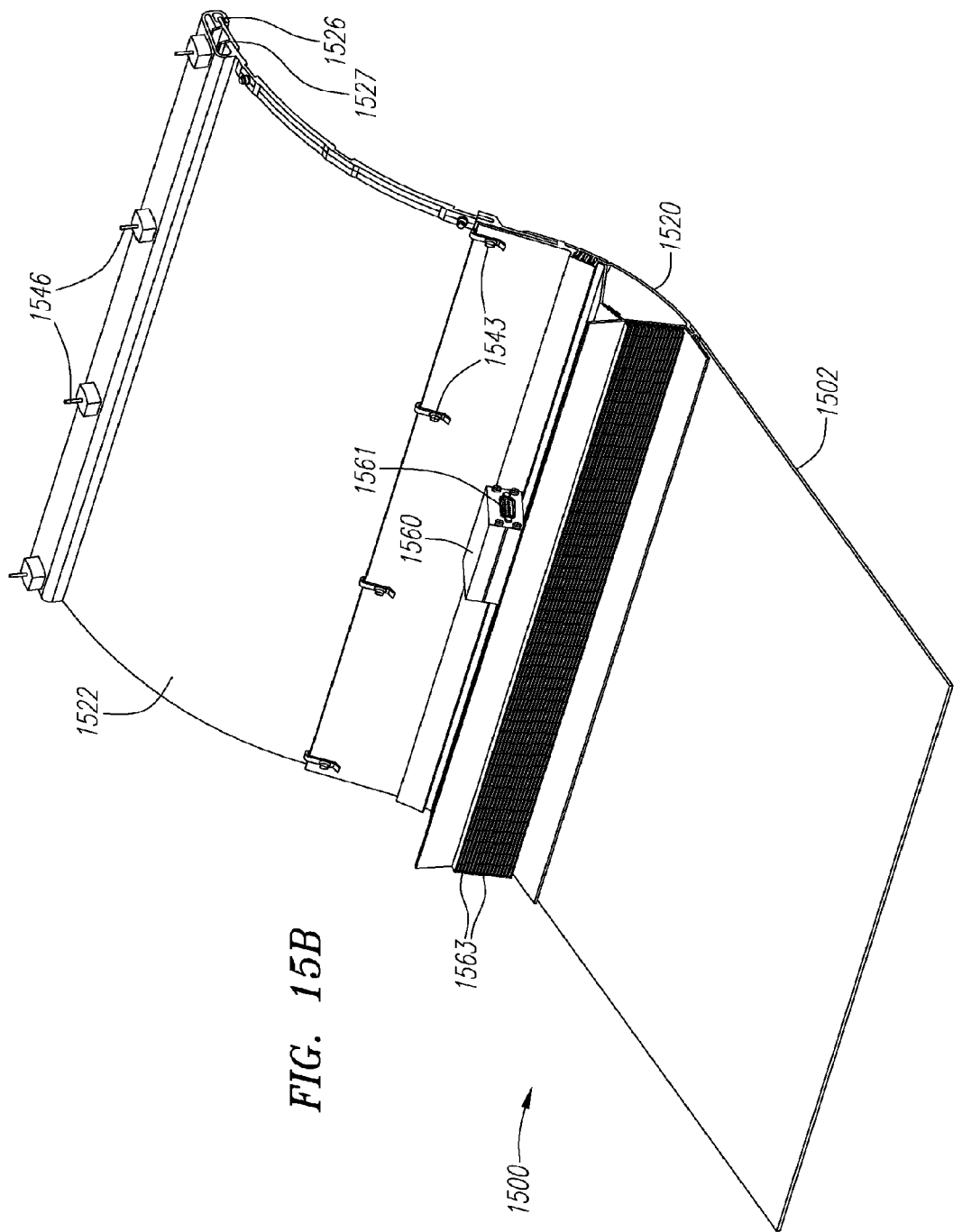
Figure 15C:
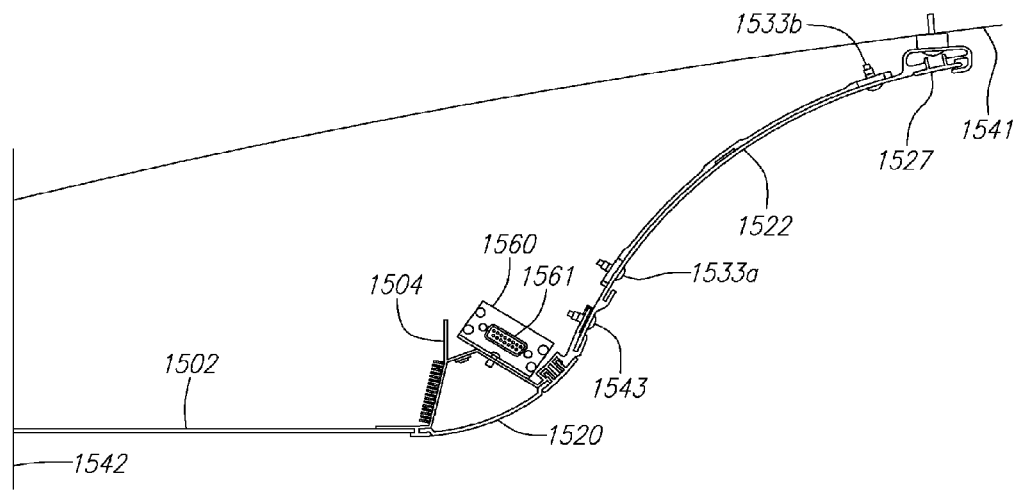
FIGS. 15C and 15D illustrate cross-sectional side views (the latter being an assembly diagram) of the lighting panel fixture illustrated in FIGS. 15A and 15B.
Figure 15D:
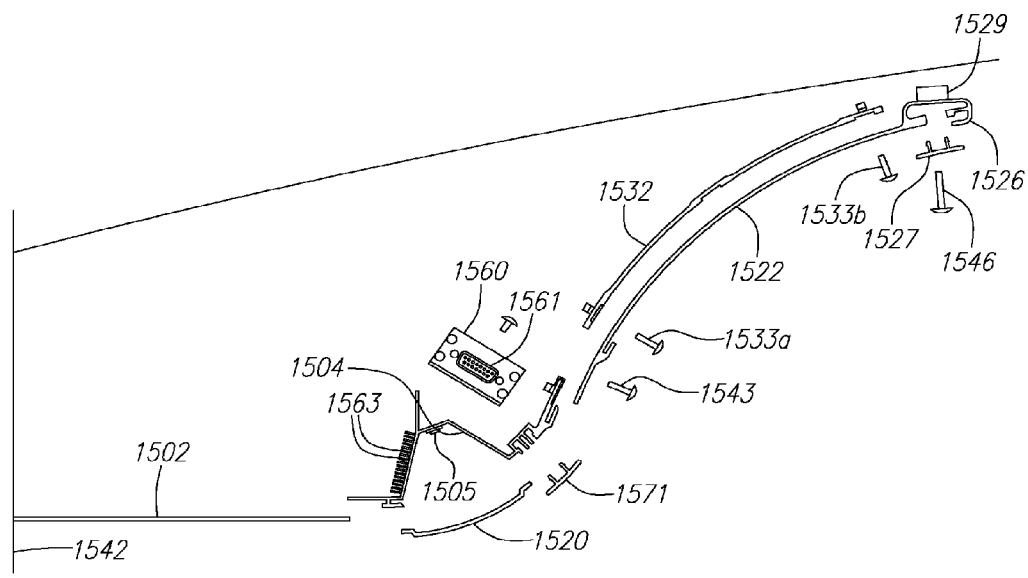

FIGS. 15A, 15B, 15C and 15D are diagrams illustrating another embodiment of an LED lighting fixture 1500 as may be used in connection with various LED control network embodiments as disclosed herein. FIGS. 15A and 15B illustrate front and back oblique views, respectively, while FIGS. 15C and 15D illustrate cross-sectional side views of the lighting panel illustrated in FIGS. 15A and 15B. FIG. 15D illustrates various individual components of the LED lighting fixture 1500 prior to assembly, whereas FIG. 15C illustrates those same components after assembly.

As illustrated in FIGS. 15A and 15B, the lighting panel fixture 1500 includes a ceiling panel 1502, an LED lighting mount 1504, and a riser panel 1522, similar to the embodiment of FIG. 11A but without a hinge mechanism. The ceiling panel 1502 is generally configured to be positioned directly over the seating in the transit vehicle, and may abut the interior sidewall of the transit vehicle. The riser panel 1522 is, in this particular embodiment, curved in approximately a quarter arc shape, and would generally reach to the ceiling of the transit vehicle or some other top mounting surface. As before, the riser panel 1522 may optionally be configured to allow mounting of advertising prints or similar materials, as is common in the transit industry. The LED lighting mount 1504 interconnects the ceiling panel 1502 and the riser panel 1522. The riser panel 1522 may be secured to the LED lighting mount 1504 with screws 1543, which may be attached using clip-on extrusions as illustrated more clearly in FIGS. 15C and 15D.

The LEDs 1505 (shown in side view in FIGS. 15C and 15D) may be positioned along the LED lighting mount 1504 in a linear array or in some other configuration, similar to the configuration illustrated in FIG. 11G. As before, a removable light permeable cover 1520 may be provided or affixed to the LED lighting mount 1504, for softening or evening out the illumination from the LEDs 1505. Snap-in lens holder 1571 may be manually removed (e.g., popped out) to allow convenient removal of the light permeable cover 1520.

In one embodiment, the LED lighting mount 1504 of the LED lighting fixture 1500 is constructed using aluminum extrusion, and operates as a heat sink in addition to providing physical support for the LEDs. As before, the LED lighting mount 1104 may be configured with metallic heat dissipating fins 1563 on the backside of one or more of its walls. The riser panel 1522 may be constructed of a lightweight durable material such as fiberglass, or PVC plastic. Ceiling panel 1502 is preferably formed of a composite material, such as two metal layers sandwiching an insulator material. The length of the lighting panel fixture 1500 may vary depending upon lighting needs, and the use of LEDs (as opposed to, e.g., fluorescent tubes) increases the flexibility of fixture lengths and sizes. In one particular example, the lighting panel fixture 1500 is approximately 60" in length. The lighting panel fixture 1500 may comprise multiple LED units (or "light bars") 1550 (in one example, five such LED units 1150, each approximately 12" long). Each LED unit 1550 in this example may have eight LEDs 1505, arranged in a linear array, and which may be mounted on a metal PCB to help dissipate heat. The LED lighting panel fixture 1500 may have a control (i.e., slave) module to drive the LEDs 1505 of the multiple LED units 1550, as described with respect to FIGS. 2A through 4 previously. The control module may be contained in a control module housing 1560 on the backside of the LED lighting mount 1504, as illustrated in FIGS. 15A and 15B. Multiple lighting panel fixtures 1500 may be connected using cables with complementary connectors at either end (similar to FIG. 2B), in a daisy chain fashion, as previously described.

In the exemplary LED lighting panel fixture 1500 illustrated in FIGS. 15A through 15D, the conduits in which the LED units 1550 reside are open at either end, so that when the LED lighting panel fixtures 1500 are placed in a row, a single continuous conduit is formed, thereby potentially simplifying cleaning of the lighting fixtures as previously described.

Figure 15E:
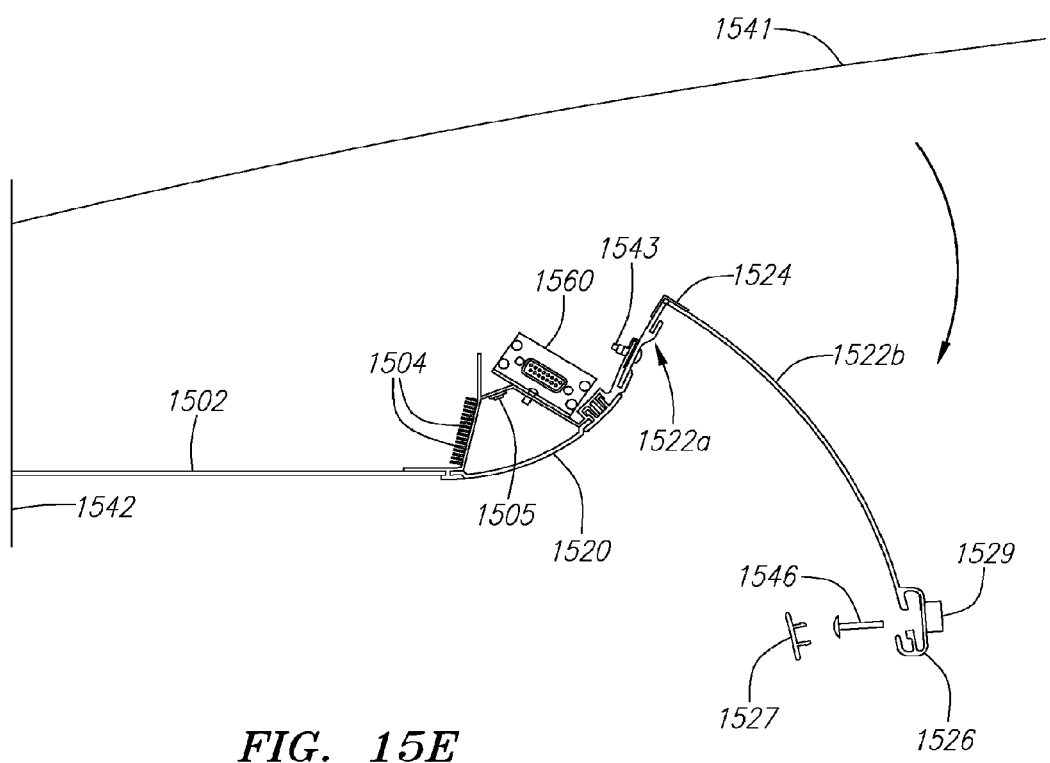
FIG. 15E is a variation having a permanent hinge in the curved riser panel for access behind the lighting panel fixture.

FIG. 15E is a side view diagram similar to FIGS. 15C and 15D, but illustrating a variation of the LED lighting fixture including one possible permanent hinge mechanism. Unlike the embodiment illustrated in FIG. 11A, the riser panel 1522 in this example is not detachably hinged, but instead is permanently hinged such that it can be rotated downwards (as illustrated in FIG. 15E) to allow temporary access to, e.g., a utility panel or a storage compartment. In this example, an elongate hinge member 1524, such as a "piano hinge" style hinge, traverses the riser panel 1522. Removable insert 1527 may be manually removed to allow access to screws 1546, which can be loosened to permit the riser panel 1522 to be rotated downwards as shown in FIG. 15E. To re-secure the riser panel 1522, the opposite steps may be carried out.

In alternative embodiments, other means may be provided (such as a sliding door or screw-on panel) to allow access behind the riser panel.

The control network architecture for the various embodiments of the LED-based control systems described herein may utilize, for example, control networks disclosed or described in one or more of U.S. Pat. Nos. 5,907,496, 6,061,600, 6,094,416, 6,147,967, 6,201,995, 6,611,860, 6,961,306, 7,046,621, 7,046,622, and/or 7,065,039, all of which are assigned to the assignee of the present invention and hereby incorporated by reference as if set forth fully herein.

Figure 5:
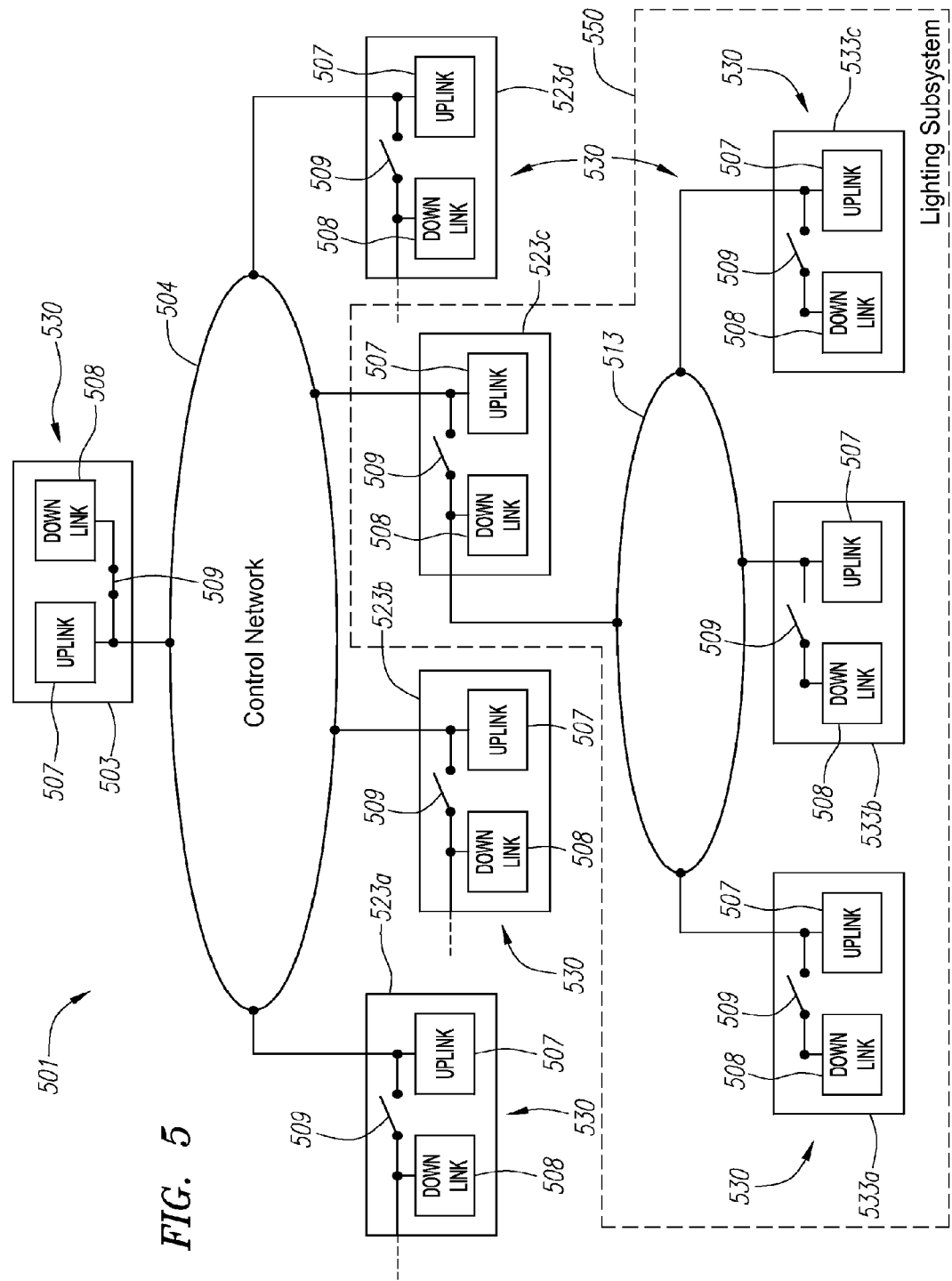
FIG. 5 is an architectural diagram of a master-slave control network for a transit vehicle, illustrating a possible relationship of the lighting control system to other components in the control network.

For example, FIG. 5 is a high-level architectural diagram of a master-slave control network 501 for a transit vehicle, illustrating a possible relationship of an LED-based lighting control subsystem 550 to other components in the control network 501. In the context of FIG. 5, a node acting as a master bus controller for a particular bus will be referred to as a "master node" for that particular bus, and the other nodes on that bus will be referred to as "slave nodes" for that particular bus. In FIG. 5, a master node 503 and a plurality of first-tier slave nodes 523 are connected to a main data bus 504. In a preferred embodiment, each of the slave nodes 523 is configured or can be configured to control a secondary data bus. For example, the first-tier slave node 523C is shown connected to a secondary data bus 523 in the control network 501. The first-tier slave node 523C functions as a second-tier master node with respect to second-tier slave nodes 533 connected to the secondary data bus 513. Others of the first-tier slave nodes 523 can also serve as second-tier master nodes and be connected to different secondary buses having additional second-tier slave nodes. A multi-level or multi-tiered hierarchical control network is thereby established.

Each of the master node 503, first-tier slave nodes 523, second-tier slave nodes 533, and other lower-level slave nodes (not shown in FIG. 5) are referred to hereinafter generically as "nodes" and are designated as nodes 530 in FIG. 5. In one aspect of a preferred embodiment as shown in FIG. 5, each of the nodes 530 has substantially the same hardware configuration and can therefore function as either a master node or a slave node, depending upon how the control network 501 is configured. Each data bus, along with the nodes attached to it, may be generally referred to as a cell, and the master node connected to the data bus is referred to as a "cell controller" for that particular cell. As explained in more detail hereinafter, each node 530 configured as a master node transmits and receives messages over the data bus for the cell it controls. Each node 530 configured as a slave node remains in a listen mode, receiving but not transmitting messages over that data bus, unless specifically requested to transmit information over the data bus by the master node. Any number of the slave nodes can, even though operating as a slave node with respect to an upper tier, be simultaneously operating as a master node with respect to other lower-tier slave nodes at a different cell sub-level.

A preferred embodiment of the control network 501 involves a mechanism for redundant backup control of any node functioning as a master node at any level or sub-level of the control network 501. Generally, the slave nodes connected to a particular data bus monitor the data bus while in a listen mode and await periodic signals from the master node for that data bus. Upon a failure to receive a signal from a master node within an expected time, the slave nodes connected to that data bus begin a wait period (which is preferably a different wait period for each slave node connected to the data bus). When the wait period elapses, the slave node determines that a failure in the master node for the particular data bus has occurred, and takes steps to take over the functionality of the master node. Each of the slave nodes is preferably programmed with a different wait period, so that there is no contention for replacing the master node when a master node failure has occurred. In one aspect, backup control of each master node is prioritized, such that there is a specific order in which the slave nodes can potentially take over control of the master node functionality when a failure has occurred.

In more detail, one of the nodes 530 attached to the main data bus 504 is configured as a master node 503. The other nodes 530 attached to the main data bus 504 (in this example numbering four such nodes 530) are configured as first-tier slave nodes 523, meaning that they receive but do not transmit master-control signals over the main data bus 504. The first-tier slave nodes 523 may, however, from time to time send responsive signals or status signals over the main data bus 504.

In a preferred embodiment, each of the first-tier slave nodes 523 may be configured as a second-tier master node controlling a secondary bus. One such example is shown in FIG. 5, wherein first-tier slave node 523C is connected to a secondary data bus 513. A plurality of other nodes 530 are also attached to the secondary bus data 513, and serve as second-tier slave nodes 533. There are three such second-tier slave nodes 533 in the example shown in FIG. 5. With respect to the secondary data bus 513, the first-tier slave/second-tier master node 523C transmits master-control signals to the second-tier slave nodes 533. The second-tier slave nodes 533 ordinarily operate only in a listen mode, but from time to time may send responsive messages or status messages to the second-tier master node 523C. The other first-tier slave nodes 523A, 523B and 523D may similarly be connected as second-tier master nodes (i.e., cell controllers) each controlling its own secondary bus or cell.

While the control network 501 shown in FIG. 5 has four first-tier slave nodes 523 and three second-tier slave nodes 533, the number of first-tier slave nodes 523 and second-tier slave nodes 533 is limited only by the ability of the master node to communicate with the slave nodes over the particular data bus. There may be more slave nodes or fewer slave nodes on each bus than shown in the control network 501. In a preferred embodiment, there are no more than eight such cell controllers, although more than eight may be used so long as processing capacity and speed permit.

Figure 8:
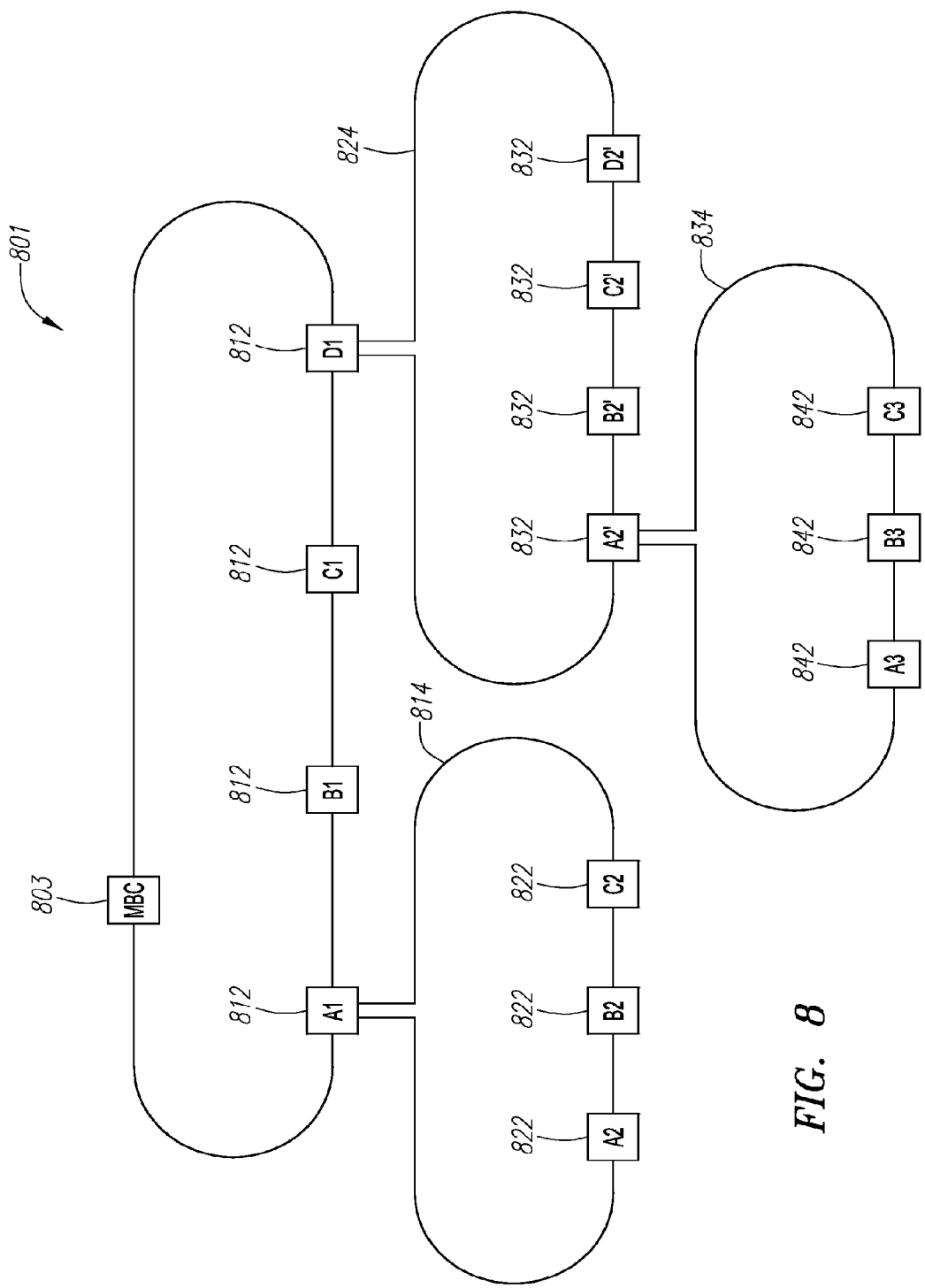
FIG. 8 is an architectural diagram of another embodiment of a hierarchical control network, having a third-tier bus, as may be used in connection with a lighting system control network as disclosed herein.
Figure 9:
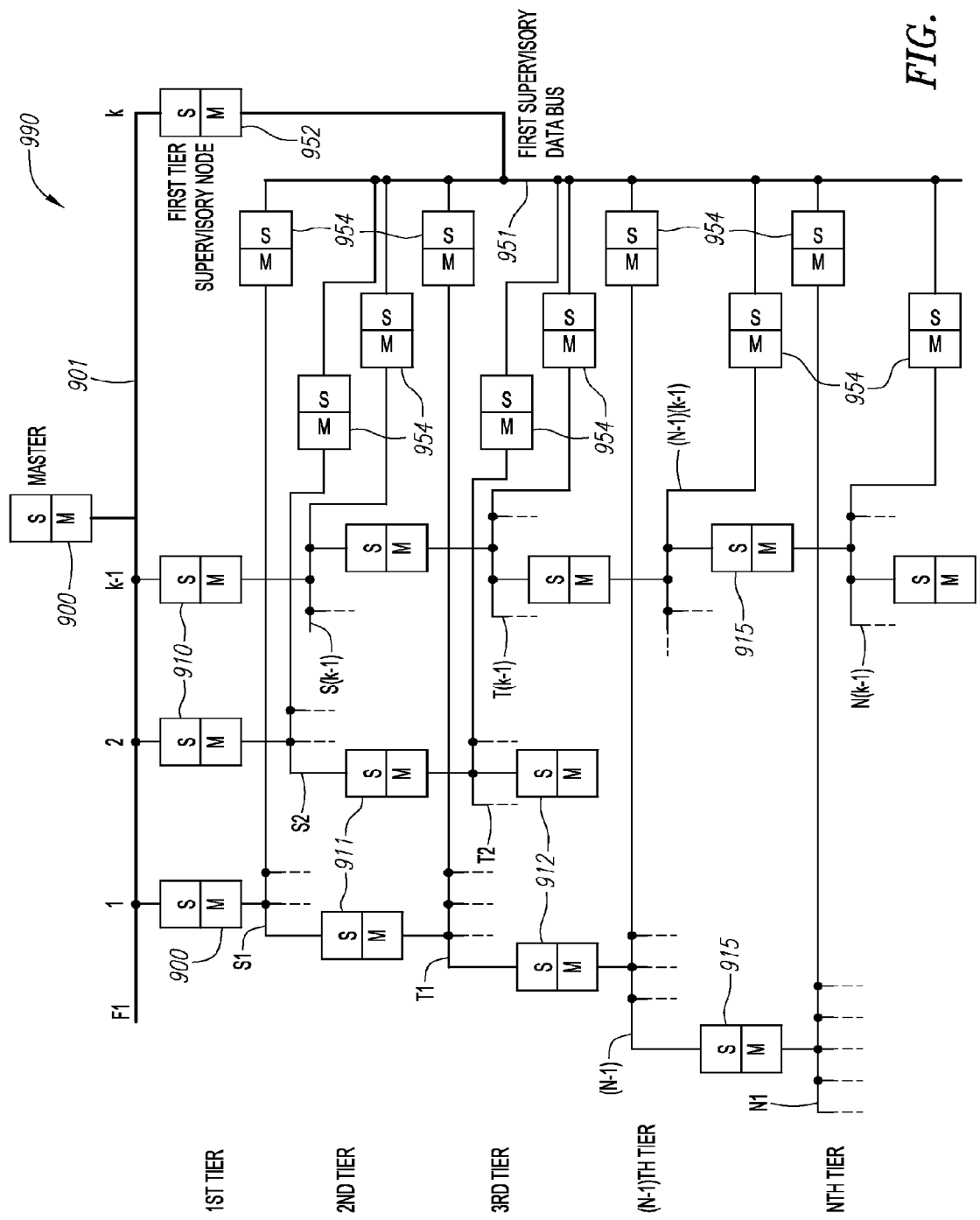
FIG. 9 is an architectural diagram of a hierarchical control network with a matrix architecture providing supervision of mid- and lower-tier levels of the control network, as may be used in connection with a lighting system control network as disclosed herein.

In addition, further levels of control nesting beyond two data buses may also be provided, using a similar approach to the two data bus method. Thus, for example, one or more of the second-tier slave nodes 533 may be configured as a third-tier master node controlling its own tertiary or third-tier data bus. While FIG. 5 only shows two nested control levels, the same control concepts would apply to a control network architecture having additional nested control levels. Examples of control networks having more than two data buses are depicted in FIGS. 8 and 9 and described in more detail hereinafter.

In a preferred embodiment, communication over the main data bus 504 and the secondary data bus 513 (or buses, if appropriate) is time-multiplexed such that only one node 530 is transmitting over a particular data bus at a given time. Usually, each transmitted message will be targeted for a specific destination node 530, which may be specified by address bits in the transmitted message. However, in some embodiments broadcast messages may also be used targeted to multiple nodes 530.

Responsibilities for tasks, or groups of tasks, may be assigned to specific nodes 530. For example, each of the first-tier slave nodes 523 may be assigned a distinct sphere of responsibility. Similarly, each of the second-tier slave nodes 533 may be assigned a distinct sphere of responsibility.

Each of the nodes 530 preferably comprises an uplink transceiver 507, a downlink transceiver 508, and a switch 509. Each of the nodes 530 receives signals over its downlink transceiver 508. Over the main data bus 504, the first-tier master node 503 transmits master-control signals to each of the first-tier slave nodes 523. From time to time, according to the programmed control protocol, the first-tier slave nodes 523 respond to the master-control signals, or otherwise send status messages to the first-tier master node 503 when events occur specific to that first-tier slave node 523. Otherwise, the first-tier slave nodes 523 do not ordinarily communicate with each other.

In a similar manner, over each secondary data bus (such as secondary data bus 513), the second-tier master node 523 (for example, first-tier slave/second-tier master node 523C in FIG. 5) transmits master-control signals to each of the second-tier slave nodes 533 connected to the same secondary data bus. From time to time, according to the programmed control protocol, the second-tier slave nodes 533 respond to the master-control signals, or otherwise send status messages to the second-tier master node 523C when events occur specific to that second-tier slave node 533. Otherwise, the second-tier slave nodes 523 do not ordinarily communicate with each other.

Communication between nodes is preferably carried out using half-duplex time division multiplexing. In typical operation, the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. Each of the slave nodes are polled in turn so that the master node can keep track of events happening throughout the system.

A communication protocol is preferably established so as to avoid collisions on each of the data buses. A simple and effective communication protocol is one in which the master node for the particular data bus sends a control message to a particular slave node, which responds with an acknowledgment or status message within a predetermined amount of time before the master node contacts another slave node. Slave nodes generally do not initiate communication without being first polled by the master node. The master node may also send out a broadcast control message that is intended for receipt by more than one of the slave nodes. The broadcast control message can comprise a node identification number or address that instructs a single particular node to respond to the broadcast control message. The single node selected for response may be the most critical node requiring receipt of the broadcast control message.

Failure of the current master node (at any of the control levels) commonly results in the master node either failing to transmit, or else transmitting improper control information to the slave nodes over the data bus. According to a preferred redundant backup control protocol, the slave nodes periodically receive master-control messages from the master node and, in the event that proper master-control messages fail to appear, initiate a failure mode response procedure. For example, a slave node may take over the responsibilities of the master node if it fails to detect a transmission from the master node within the expected time period.

In one embodiment, the lighting subsystem 550 comprises a portion of the larger control network 501 of the transit vehicle. A second-tier master node 523B functions as the master node 203 described with respect to FIG. 2A, and the other nodes coupled to bus 513, i.e., nodes 533A, 533B and 533C in this example, function as the LED/slave nodes 202 in FIG. 2A. While the lighting subsystem master node 523B generally provides high-level control for the lighting subsystem 550, the lighting subsystem master node 523B may itself be a slave node with respect to the higher level of the control network hierarchy. In other words, the lighting subsystem master node 523B may act as a slave node with respect to first-tier bus 504, under control and direction of first-tier master node 503. In one example, the downlink transceivers 508 of slave nodes 533A, 533B and 533C may not necessarily control other lower level network tiers, but rather would primarily be provided for redundant backup control of the lighting subsystem master node 523B in accordance with the operation described herein.

Figure 6:
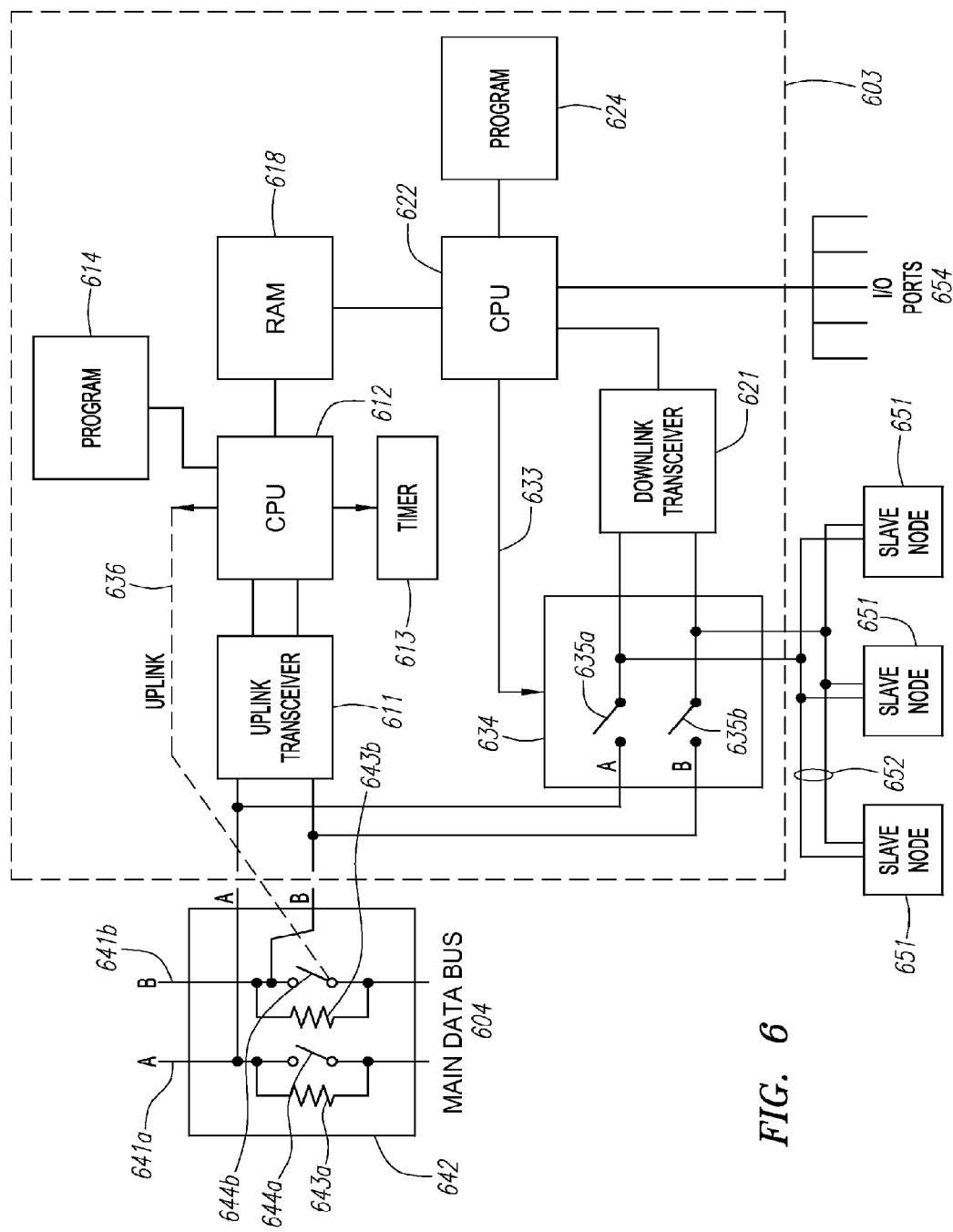
FIG. 6 is a block diagram of a network node as may be used within the control network architecture shown in FIG. 5 or otherwise.

FIG. 6 is a block diagram of an embodiment of a network node 603 as may be used within the control network architecture shown in FIG. 5. Detection of and response to a failure mode condition may be explained in greater detail with reference to the network node 603 illustrated in FIG. 6. Because failure mode detection and response may be carried out by a node 530 operating as a slave node, the following discussion will assume that the node 603 shown in FIG. 6 is initially configured as a slave node. Further, for simplicity of explanation, it will be assumed that the node 603 shown in FIG. 6 is a first-tier slave/second-tier master node connected to a main bus and a secondary bus (such as first-tier slave/second-tier master node 523C connected to the main data bus 504 and secondary data bus 513 in FIG. 5), although the same node circuit configuration is preferably used for each of the nodes 530, regardless of control level, for ease of construction and flexibility purposes.

In the node block diagram of FIG. 6, a node 603 is shown connected to a first bus (e.g., main bus) 604. The node 603 comprises an uplink transceiver 611, a downlink transceiver 621, a CPU 612 connected to the uplink transceiver 611, and another CPU 622 connected to the downlink transceiver 621. Both CPUs 612, 622 are preferably connected to a dual-port RAM 618, and each CPU 612, 622 is connected to a ROM program store 614 and 624, respectively. The second CPU 622 is connected through an appropriate interface to I/O ports 654, which may comprise sensor inputs, control signal outputs, status LEDs, LCD display, keypad, or other types of external connections.

Each node 603 is preferably capable of both sending and receiving messages (e.g., control instructions). Typically, the uplink transceiver 611 operates in a "slave" mode whereby the node 603 receives control instructions using the uplink transceiver 611 and then responds thereto, and the downlink transceiver 621 operates in a "master" mode whereby the node 603 issues control instructions (e.g., polls slave nodes) and awaits a response from other nodes after sending such control instructions.

The downlink transceiver 621 of the node 603 is connected to a secondary data bus 652, to which is also connected a plurality of second-tier slave nodes 651 (assuming the node 603 is a first-tier slave/second-tier master node). The node 603 thereby functions as a first-tier slave node with respect to the main data bus 604, receiving with its uplink transceiver 611 first-tier master-control signals over the main bus 604 from a first-tier master node (such as master node 503 shown in FIG. 5), and also functions as a second-tier master node with respect to the secondary data bus 652, transmitting second-tier master-control signals with its downlink transceiver 634 to second-tier slave nodes 651.

The node 603 also comprises a pair of switches 635a, 635b connected between the downlink transceiver 621 and the signal lines 643a, 643b of the main data bus 604. In normal operation, the switches 635a, 635b remain open (unless the node 503 is also the first-tier master node, such as master node 503 shown in FIG. 5, in which case the switches 635a, 635b would be closed), and the downlink transceiver 621 is thereby isolated from the main data bus 604. However, when a first-tier master node failure condition is detected, switches 635a, 635b are closed, enabling the downlink transceiver 621 to take over for the first-tier master node. The downlink transceiver 621 would therefore function simultaneously as master node with respect to both the main data bus 604 and the secondary data bus 652.

In a preferred embodiment, detection of a master node failure condition on the main data bus 604 is accomplished using a timer mechanism, such as a hardware timer 613 accessible (either directly or indirectly) by the CPU 612 that is connected to the uplink transceiver 611. According to a preferred control protocol (assuming the node 603 is a first-tier slave/second-tier master node), the uplink transceiver 611 of node 603 receives first-tier master-control signals periodically from the first-tier master node (such as master node 503 in FIG. 5). The master-control signals may, for example, request status information from the node 603, or instruct the node 603 to carry out certain control or input/output functions. The node 603 ordinarily responds by carrying out the requested functions and/or sending an acknowledgment or status signal to the first-tier master control node using the uplink transceiver 611.

Timer 613 times out a wait period between master-control signals received from the first-tier master control node. In a preferred embodiment, each time the uplink transceiver 611 receives a master-control signal from the first-tier master node that is recognized as an appropriate master-control signal within the particular programmed control protocol (whether or not the master-control signal is directed to the particular node 603), the CPU 612 connected to the uplink transceiver 612 resets the timer 613. If the timer 613 ever times out, then CPU 612 responds by asserting a failure mode response procedure. The timing out of timer 613 may result in an interrupt to CPU 612 in order to inform the CPU 612 of the failure to receive master-control signals, or else the CPU 612 may periodically monitor the timer 613 and, when the CPU 612 notices that the timer 613 has timed out, assert a failure mode response procedure.

When a failure mode condition is detected, the CPU 612 sets a failure mode status bit in a predetermined flag location within the dual-port RAM 618. The other CPU 622 periodically monitors the failure mode status bit in the dual-port RAM 618 and is thereby informed when a failure occurs. Alternatively, instead of the CPUs 612, 622 communicating through the dual-port RAM 618, timer 613 can directly inform CPU 622 when a failure to receive master-control signals has occurred (i.e., when timer 613 has timed out).

When the CPU 622 has been informed or otherwise determined that a failure mode condition exists, and that the first-tier master node has presumably failed, the CPU 622 sends a signal over control line 633 to close switches 635a, 635b, thereby connecting the downlink transceiver 621 to the main bus 604. From that point on, the CPU 622 performs as the first-tier master node with respect to the main bus 604. The node 603 can continue to receive information over the main data bus 604 using the uplink transceiver 611. Alternatively, the node 603 may thereafter perform all transmission and reception over both the main bus 604 and the secondary bus 652 using the downlink transceiver 621. When the failure mode is entered, the CPU 622 may be programmed so as to directly carry out the I/O port functions for which it previously received instructions from the first-tier master node, or the node 603 may send master-control signals to its own uplink transceiver 611 and thereby continue to carry out the I/O port functions as it had previously been doing. In other words, the node 603 can give itself control instructions over the main data bus 604 so that it can continue to perform its previously assigned functions. If, after taking over for the first-tier master node, the node's downlink transceiver 611 should fail, the node 603 can still continue to perform its control functions when the next slave node takes over control as the new first-tier master node (as later described herein), because its uplink transceiver 611 continues to function in a normal manner.

According to the above described technique, the node 603 thereby substitutes itself for the first-tier master node upon the detection of a first-tier master node failure as indicated by the failure to receive the expected first-tier master-control signals. Should the node 603 fail, either before or after taking over control for the first-tier master node, the next first-tier slave node would take over and become the first-tier master node in a similar manner to that described above.

Referring again to FIG. 5, the order in which the first-tier slave nodes 523 take over for the first-tier master node 503 is dictated by the wait period timed out by the timer 613 of the particular first-tier slave node 523. The timer 613 (see FIG. 6) for each first-tier slave node 523 is programmed or reset using a different time-out value. A first-tier slave node 523 only asserts a failure mode condition when its internal timer 613 reaches the particular timeout value programmed for that particular node 523.

While the programmed wait periods for the internal timer 613 in each first-tier slave node 523 can vary depending upon the control application, illustrative wait periods are programmed in ten millisecond increments. Thus, for example, first-tier slave node 523a could be programmed with a 10 millisecond wait period; the next first-tier slave node 523b could be programmed with a 20 millisecond wait period; the next first-tier slave node 523c could be programmed with a 30 millisecond wait period; and the last first-tier slave node 523d could be programmed with a 40 millisecond wait period; and so on. First-tier slave node 523a would take over as the first-tier master node if 10 milliseconds elapses without it receiving any proper first-tier master-control signals; the next first-tier slave node 523b would take over as the first-tier master node if 20 milliseconds elapses without it receiving any proper first-tier master-control signals; the next first-tier slave node 523c would take over as the first-tier master node if 30 milliseconds elapses without it receiving any proper first-tier master-control signals; and so on.

Use of 10 millisecond increments for the wait periods in the above example is considered merely illustrative, and the actual wait periods should be selected depending upon the time criticality of the control messages, and the number of messages that may be missed before a high enough degree of certainty is established that the master node has failed. For example, if a slave node expects to observe a control-message signal on the data bus no later than every 5 milliseconds, then the slave node may be programmed to assert a failure mode condition after a wait period corresponding to the absence of a predefined number of messages—for example, twenty messages (i.e., 100 milliseconds). If critical aspects of the system requiring master node control need to be serviced in a shorter time period, then the wait period would have to be reduced to accommodate the time-sensitive components of the system.

The order in which the slave nodes take over for the master node need not be dictated by the relative position in the control loop of the slave node with respect to the master node, but rather may be dictated according to the programmed wait period in each slave node. Flexibility is thereby provided in the order of priority in which the slave nodes take over for the master node in the event of a failure event.

Accordingly, by use of the aforementioned techniques described herein, redundant backup for the first-tier master node 503 is provided. Such redundant backup control is provided without requiring additional physical nodes to be located within the control system, and without having to provide wiring for such additional physical nodes to the buses 504 or 513. The redundant backup for the master node 504 is also accomplished while resolving contention problems that might otherwise occur if each of the first-tier slave nodes 523 were programmed with the identical timeout period.

In a preferred embodiment, redundant backup control is provided in a similar manner for the secondary data bus 513, and each additional data bus that may be provided in the system. Thus, each of the second-tier slave nodes 533 is preferably configured with the circuitry shown for node 603 in FIG. 6, and each of the second-tier slave nodes 533 can therefore substitute itself for the first-tier slave/second-tier master node 523c if the first-tier slave/second-tier master node 523c fails.

If a particular node is operating as a master node for two buses as a result of a failure of the master node on a higher-tier bus, and the node operating as such fails, then it is possible that two different nodes will take over for the failed node, one node taking over on each bus. For example, supposing that first-tier slave/second-tier master node 523c has already taken over as the first-tier master node due to a failure of the master node 503, and further suppose that first-tier slave/second-tier master node 523c too fails, then the next first-tier slave node 523d would take over as the first-tier master node with respect to the main data bus 504, but the first second-tier slave node 533a would take over as second-tier master node with respect to the secondary data bus 513.

In the above manner, despite the failure of one or more nodes, substantial functionality of the control system as a whole can be maintained. A failed node is essentially discarded or bypassed to the extent possible so as to maintain the highest possible degree of continued operability. Furthermore, because certain parts of the system will continue operate despite the failure of the master node, identification of the failed node by engineers or maintenance personnel should be simplified by being able to identify the inoperative portion of the system that has become isolated due to the failure.

In one aspect, separation of responsibility in each node 603 of master functions and slave functions between two different CPU's each operating with a different transceiver allows the node 603 to potentially continue operating as either a master node or a slave node should one of the CPU's fail, providing that the failure does not disrupt both of the transceivers at the node 603.

In one embodiment, the nodes 530 of FIG. 5 are wired using a single cable connecting all of the nodes 530 in a loop configuration. Details of such a wiring technique are described in U.S. Pat. No. 5,907,486 entitled "Wiring Method and Apparatus for Distributed Control Network," assigned to the assignee of the present invention, and previously incorporated herein by reference.

In other embodiments, the nodes 530 of FIG. 5 are configured with fault isolation and recovery circuitry in the case of a short circuit or similar event. Details of such fault isolation and recovery circuitry are described, for example, in U.S. Pat. No. 6,147,967 entitled "Fault Isolation and Recovery In A Distributed Control Network," incorporated by reference as if set forth fully herein.

Figure 7:
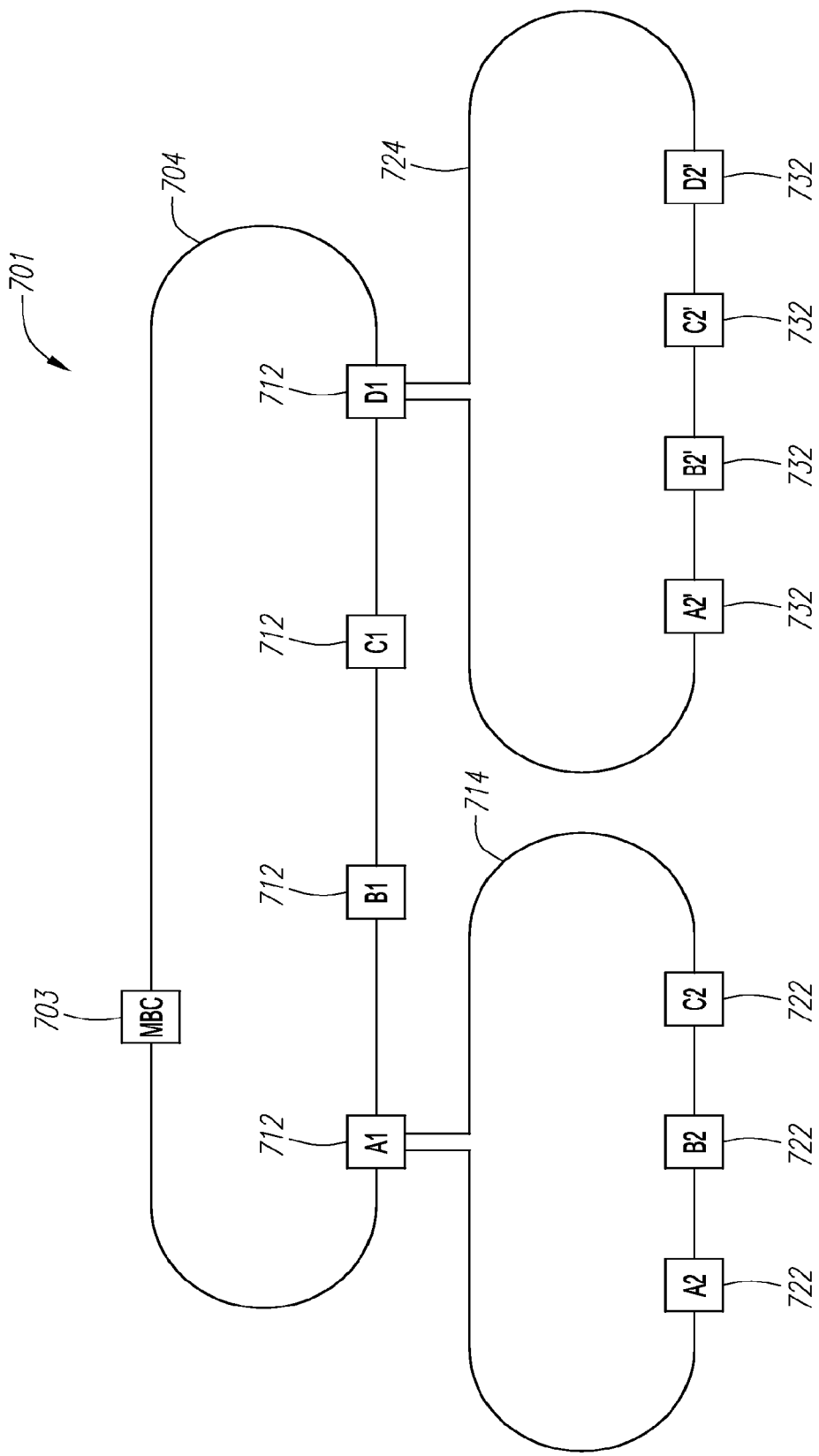
FIG. 7 is a diagram of a hierarchical control network architecture in accordance with another embodiment, and having multiple second-tier buses.

FIG. 7 is a diagram of another example of a control network architecture in accordance with another embodiment, and having multiple second-tier buses. Each of the nodes shown in FIG. 7 may be configured to include the circuitry shown for preferred node 603 in FIG. 6. FIG. 7 shows an example of a control network architecture for a control network 701 having three data buses 704, 714 and 724. A first-tier master node 703 and a plurality of first-tier slave nodes 712 are connected to the main data bus 704. One of the first-tier slave nodes 712, designated as A1 in FIG. 7, operates as a second-tier master node, and is connected to the second data bus 714 along with a plurality of second-tier slave nodes 722. Another of the first-tier slave nodes 712, designated as D1 in FIG. 7, operates as another second-tier master node, and is connected to the third data bus 724 along with another plurality of second-tier slave nodes 732. The other first-tier slave nodes 712, designated B1 and C1 in FIG. 7, could also be configured as master nodes of a second-tier bus. The particular example in FIG. 7 thereby provides a hierarchical control network 701 having two control levels or tiers, and three data buses.

FIG. 8 is a diagram of another example of an embodiment of a hierarchical control network 801, having a third-tier bus, as may be used in connection with a lighting system control network as disclosed herein. The control network 801 shown in FIG. 8 has four buses 804, 814, 824 and 834. Similar to FIG. 7, a first-tier master node 803 and a plurality of first-tier slave nodes 812 are connected to the main data bus 804. One of the first-tier slave nodes 812, designated as A1 in FIG. 8, operates as a second-tier master node, and is connected to the second data bus 814 along with a plurality of second-tier slave nodes 822. Another of the first-tier slave nodes 812, designated as D1 in FIG. 8, operates as another second-tier master node, and is connected to the third data bus 824 along with another plurality of second-tier slave nodes 832. One of the second-tier slave nodes 832 connected to the third data bus 824, denoted as A2' in FIG. 8, operates as a third-tier master node with respect to the fourth data bus 834, which is connected to a plurality of third-tier slave nodes 842. The structure of FIG. 8 thereby provides a hierarchical control network 801 having three control levels or tiers, and four data buses. In the context of FIG. 8, the control network subsystem associated with any of the data buses 804, 814, 824 or 834 may represent the lighting control subsystem used in a transit vehicle, although the lighting control subsystem is more likely to be associated with a lowest level tier such as the subsystems associated with buses 814 or 834.

It will be appreciated that, expanding the approach used in FIGS. 7 and 8, additional control levels may be created by adding successive lower control tiers, or additional slave nodes at any particular tier may be configured as cell controllers to control additional localized data buses. A great deal of flexibility is thereby provided in establishing a hierarchical control structure suitable for many different control applications.

FIG. 9 is a diagram of a hierarchical control network with a matrix architecture providing supervision of mid- and lower-tier levels of the control network, as may be used in connection with a lighting system control network as disclosed herein, and based on similar principles to those described with respect to the control networks of FIGS. 5, 7 and 8. In FIG. 9, a first-tier master node 900 and a plurality of first-tier slave nodes 902 are connected to the main data bus 901. Each of the first-tier slave nodes 902 (up to, e.g., k nodes) may operate as a second-tier master node with respect to a respective second-tier data bus (denoted 9S1, 9S2 . . . 9Sk in FIG. 9), each of which has connected to it a plurality of second-tier slave nodes 903. Likewise, each of second-tier slave nodes 903 may be connected to a respective third-tier data bus (denoted 9T1, 9T2 . . . 9Tk in FIG. 9), each of which has connected to it a plurality of third-tier slave nodes 904. This same expansion may occur at lower tier levels, with respect to fourth-tier data buses (denoted 9F1, 9F2 . . . 9Fk in FIG. 9) down to the Nth level. The control network 950 depicted in FIG. 9 thereby provides a multiple-bus hierarchical control scheme, with each node preferably capable of fanning out to a number of lower-level slave nodes, which may be repeated down to an arbitrary number of levels or tiers.

In a preferred embodiment, each node in FIG. 9 is given a unique node identifier to facilitate communication among the various nodes in the network. The unique node identifier may comprise, for example, a series of three binary numbers XYZ, the first number X identifying the tier for which the node is connected in its capacity as a slave, the second number Y identifying which bus of the tier (i.e., tier X) the node is attached to by identifying the relative position of the bus with respect to the other buses attached to the tier, and the third number Z identifying the relative position of the node with respect to other nodes attached to the same bus (i.e., bus Y of tier X).

The control network architecture depicted in FIG. 9 has the advantage of being relatively easily expandable and is capable of controlling very large networks. To reduce the potential for time lag or latency in very large networks when propagating important communications from lower tier nodes through a number of intermediary nodes up to the first-tier master node 900, it may be desirable to add a supervisory network coupled to one or more of the lower-tier buses, so as to allow monitoring of communications at the lower tier levels, and to further allow the possibility of redundant backup control and/or communication with respect to the lower-tier master nodes.

FIGS. 10A and 10B are exemplary timing diagrams for communication in a hierarchical control network having a matrix architecture, such as the control network illustrated in FIG. 9. A wide variety of other communication protocols may also be used, in FIG. 9 and in connection with other embodiments as disclosed herein.

In various embodiments, an LED-based lighting control system constructed in accordance with the principles and techniques disclosed herein may exhibit a number of advantages and/or useful characteristics. For example, the lighting control system and its various components may have a long lifetime, because LEDs can operate up to 100,000 hours or more. As a result, fewer lighting fixtures require replacement over time, as compared to, e.g., fluorescent lighting fixtures, which may reduce maintenance costs (both replacement component costs and service costs). LEDs consume less current than fluorescent lights, typically using about half the power, thus resulting in a significant power savings. Using LEDs may reduce the effects of electromagnetic coupling, and also reduce arcing because the LEDs typically operate off a 12 or 24 Volt supply.

As another potential advantage, LEDs have no filaments or bulbs, and are highly durable. LEDs are generally resistant to vibration, cold, dampness, and salt spray, providing many environmental settings in which the lighting systems disclosed herein may be utilized. An LED-based lighting network may also be more environmentally friendly, as compared with fluorescent, incandescent and neon lighting, in that their construction requires less fossil fuels (required to produce the glass needed to encapsulate incandescent, fluorescent and neon lighting), and potentially environmentally harmful materials (such as Mercury) or gases (such as neon) need not be used in the manufacture of LEDs.

Another advantage of the LED-based lighting systems as disclosed herein is that the LED fixtures and individual LED units may be made any desired length, by, for example, altering the number of LEDs in the array. By contrast, fluorescent lights generally are available in only certain preset sizes, limiting flexibility. Different sized LED-based fixtures may be mixed and matched within a transit vehicle, offering great flexibility in physical layout and arrangement.

Yet another advantage of using LED-based lighting is that the LEDs can be made more directed than incandescent or fluorescent lighting, and can, for example, be targeted downwards towards passenger seating areas. In this manner, glare that might otherwise occur on the driver's windshield from lighting the passenger seating compartments can advantageously be reduced.

Use of a multiplexed control system as described in connection with certain embodiments may enhance or facilitate control of the LED-based lighting fixtures. Addressable IDs for the slave nodes may be used for selective control of different LED-based lighting fixtures in the lighting system. Connecting the LED-based lighting fixtures in a daisy chain fashion may reduce the amount of wiring required. The LED output level may also be conveniently adjusted, manually or automatically, and may be selectively reduced for example to conserve battery output during overload conditions. Using the multiplexed control system, monitoring and diagnosis of the LED-based lighting fixtures is also facilitated. The LED-based lighting fixtures may also provide emergency lighting functionality.

In certain embodiments in which a ring loop architecture is utilized, survivability and reliability of the control network may be enhanced. Hierarchical control of lighting, in a cell-based fashion, makes the architecture readily scalable and relatively easy to control and program. The control network infrastructure provides feedback for monitoring and diagnosis, and allows automatic detection of faults and their location. A control network matrix architecture may also be used, in particularly complex network settings, allowing more rapid feedback in case of emergencies.

The novel techniques described herein may be used to control both LED-based lighting systems and conventional incandescent lights. The principles described herein have applicability beyond transit vehicles, and may be used, for example, in connection with lighting systems in buildings, factories, and other facilities. The novel techniques described herein may also be combined with more general building lighting control, or with air-conditioning control, environmental control, and other electronic functions (temperature, music, etc.).

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. An LED-based lighting fixture for a transit vehicle, comprising:
    a plurality of light-emitting diodes (LEDs) for illuminating an area of the transit vehicle;
    a ceiling panel fixture including a ceiling panel adapted to abut a transit vehicle interior sidewall and an LED lighting mount on which said LEDs are disposed, said LED lighting mount having a plurality of metallic heat dissipating fins for dissipating heat generated by said LEDs; and
    a riser panel attached to said ceiling panel fixture and adapted to abut a transit vehicle ceiling or interior top mounting surface;
    wherein said riser panel includes a locking mechanism for securing the riser panel to the transit vehicle ceiling or interior top mounting surface.

2. The LED-based lighting fixture of claim 1, further comprising a local voltage regulator for receiving a power supply signal and providing a regulated power output to said LEDs.

3. The LED-based lighting fixture of claim 2, further comprising a controller for adjusting a target current level for said LEDs based upon at least one of a monitored LED temperature and a recorded age of said LEDs.

4. The LED-based lighting fixture of claim 3, wherein said controller adjusts the illumination intensity of said LEDs by adjusting a duty cycle associated with said local power regulator.

5. The LED-based lighting fixture of claim 1, wherein said LED lighting mount comprises an open-ended transverse conduit in which said LEDs are mounted, such that when a second LED-based lighting fixture is adjacently positioned the conduits of each LED-based lighting fixture line up to form a single continuous conduit.

6. The LED-based lighting fixture of claim 1, wherein said riser panel comprises a detachable hinge for releasably attaching to said ceiling panel fixture, whereby the riser panel may be fully removed from and reattached in position by releasing said locking mechanism.

* * * * *